United States Patent
Couleaud et al.

(10) Patent No.: US 12,470,826 B2
(45) Date of Patent: Nov. 11, 2025

(54) METHODS AND SYSTEMS TO IMPROVE IMAGE QUALITY AND AUTOMATE PANORAMA SHOTS

(71) Applicant: Adeia Imaging LLC, San Jose, CA (US)

(72) Inventors: Jean-Yves Couleaud, Mission Viejo, CA (US); Tao Chen, Palo Alto, CA (US); Serhad Doken, Bryn Mawr, PA (US); Ning Xu, Irvine, CA (US)

(73) Assignee: Adeia Imaging LLC, San Jose, CA (US)

( * ) Notice: Subject to any disclaimer, the term of this patent is extended or adjusted under 35 U.S.C. 154(b) by 55 days.

(21) Appl. No.: 18/214,858

(22) Filed: Jun. 27, 2023

(65) Prior Publication Data

US 2025/0008222 A1 Jan. 2, 2025

(51) Int. Cl.
| | |
|---|---|
| *H04N 23/69* | (2023.01) |
| *H04N 23/62* | (2023.01) |
| *H04N 23/63* | (2023.01) |
| *H04N 23/698* | (2023.01) |

(52) U.S. Cl.
CPC .......... *H04N 23/698* (2023.01); *H04N 23/62* (2023.01); *H04N 23/632* (2023.01); *H04N 23/635* (2023.01); *H04N 23/69* (2023.01)

(58) Field of Classification Search
None
See application file for complete search history.

(56) References Cited

U.S. PATENT DOCUMENTS

| | | | |
|---|---|---|---|
| 8,294,748 B2 | 10/2012 | Stec et al. | |
| 8,331,690 B2 | 12/2012 | Oh et al. | |
| 10,229,477 B2 | 3/2019 | Kimura | |
| 2017/0324898 A9* | 11/2017 | Karunamuni | G03B 37/02 |
| 2019/0394441 A1* | 12/2019 | Simek | H04N 13/271 |
| 2020/0336675 A1* | 10/2020 | Dawson | G06F 3/0346 |

FOREIGN PATENT DOCUMENTS

CN 109598675 A 4/2019

OTHER PUBLICATIONS

"The Photo Investigator—Explorations with Photo Metadata", retrieved at https://photoinvestigator.co/blog/how-to-post-a-panorama-on-instagram-as-a-swipeable-multi-post/, on Mar. 22, 2023.
(Continued)

*Primary Examiner* — Samuel D Fereja
(74) *Attorney, Agent, or Firm* — HALEY GUILIANO LLP

(57) ABSTRACT

Systems and methods relate to improving image quality of panoramic images. A system generates for display on a device, a user interface for capturing a panoramic image, receives image data from a camera of the device from a plurality of view angles, and generates for display on a device a preliminary panoramic image based on the image data. The system determines that a position corresponding to a particular view angle of the preliminary panoramic image is problematic, and in response to the determining, generates for display an indicator for the preliminary panoramic image prompting for the camera of the device to be repositioned to the particular view angle of the preliminary panoramic image that was determined to be problematic.

19 Claims, 14 Drawing Sheets

(56) References Cited

OTHER PUBLICATIONS

Bourke, Paul, "Chronopanorama", retrieved at http://paulbourke.net/panorama/timelapsepano/, 2010.
Brown, Matthew, "AutoStitch: a new dimension in automatic image stitching", retrieved at http://matthewalunbrown.com/autostitch/autostitch.html, Feb. 28, 2023.
John, Steven, "How to post panorama photos on Instagram in 2 different ways", Insider, retrieved at https://www.businessinsider.com/guides/tech/how-to-post-panorama-on-instagram, Jun. 29, 2020.
Pavic, Vjeran, "How to make a seamless Instagram panorama", The Verge, https://www.theverge.com/2020/2/25/21152029/instagram-panorama-how-to-make-feed-photos-dimensions, Feb. 25, 2020.
Uyttendaele, Matthew, et al., "Eliminating Ghosting and Exposure Artifacts in Image Mosaics", Proceedings/CVPR, IEEE Computer Society Conference on Computer Vision and Pattern Recognition. IEEE Computer Society Conference on Computer Vision and Pattern Recognition, 2001.
Murodjon, Abdukholikov and Taeg Keun Whangbo, "A method for manipulating moving objects in panoramic image stitching", 2017 International Conference on Emerging Trends & Innovation in ICT (ICEI), 157-161, 2017.

\* cited by examiner

922

924 — Generate, for display, an indicator for the preliminary panoramic image prompting the camera of the device to be repositioned to the particular view angle (or the range of view angles) of the preliminary panoramic image that was determined to be problematic 926 — Receive additional image data from the camera repositioned to the particular view angle (or the range of view angles)

928 — Generate for display, a modified panoramic image using at least a portion of the additional image to modify the portion of the preliminary panoramic image that is problematic 930 — Generate for display, a first modified panoramic image and a second modified panoramic image based at least in part on the additional image data 932 — Generate for display, the first modified panoramic image and the second modified panoramic image as selectable options on the user interface for storage

915

934 All images processed?

no → 903 end

FIG. 9B

METHODS AND SYSTEMS TO IMPROVE IMAGE QUALITY AND AUTOMATE PANORAMA SHOTS

BACKGROUND

The present disclosure relates to, among other things, systems and methods for creating panoramic content, automating capture of panoramic content, and user interfaces for improving panoramic capture.

SUMMARY

Electronic devices that include a camera may be able to capture photographic panorama. In one approach, the electronic device (e.g., image application running on the electronic device) may receive a first user input to begin capturing a panoramic image. An image showing a field of view approximating, or greater than, that of the human eye— about 160° by 75°—may be termed panoramic. The electronic device receives images from the camera as it is slowly moved through different orientations to point towards a panoramic landscape. The electronic device may generate a preview of a preliminary panoramic image as the camera is moving and images are being captured for the panoramic image. The electronic device may receive a second user input to end capturing the panoramic image. Responsive to receiving the second user input, the electronic device generates the panoramic image by stitching together and cropping the received images.

This approach, however, may result in problems with the electronic device generating a panoramic image when there are moving objects and changing elements in a scene. For example, it may be preferred that a panoramic image depicts what is captured at an instant in time, similar to how a photo is captured on a camera. However, a moving object can appear in multiple images that are captured for a panoramic image, and stitching the captured images together may result in the object appearing multiple times in the panoramic image. Another example is when there are changing elements in a scene, such as an electronic billboard display. The billboard may display different content in the multiple images that are captured for a panoramic image, and stitching the captured images together may result in the billboard appearing to display corrupted content (e.g., mixture of the different content that is displayed).

In one approach, the moving objects appearing as multiple objects in a panoramic image may be replaced with a single instance of the object in the panoramic image. However, if moving parts cannot be reconciled or if moving objects cover a large portion of the frame or panoramic image, the approach may not work well and the result may be undesirable. For example, if the moving object covers a large portion of the frame, removing multiple instances of the object from the panoramic image may result in lacking appropriate substitute data to fill the hole where the object was removed from the scene.

In some embodiments, systems and methods improve panorama stitching capabilities of devices by determining problematic areas of a scene (e.g., moving, changing elements, or varying parts) in a preliminary panoramic image and generating an indicator for the preliminary panoramic image prompting a camera to be repositioned at a particular view angle of the preliminary panoramic image that was determined to be problematic. The device may receive additional image data from the camera repositioned to the particular view angle, and generate for display a modified panoramic image using at least a portion of the additional image data to modify the portion of the preliminary panoramic image that was problematic. In this way, the device may generate a modified panoramic image that improves the preliminary panoramic image using the additional image data. For example, additional image data that is captured is used to fill holes where instances of a moving object were removed from a scene (e.g., where there were duplicates or duplicate portions of the moving object). In some embodiments, the indicator for the preliminary panoramic image prompts a camera to be repositioned at a range of view angles or perspectives.

In one embodiment, a system generates for display on a device, a user interface for capturing a panoramic image, receives image data form a camera of the device from a plurality of view angles, and generates for display on the device a preliminary panoramic image based on the image data. The system may determine that a portion corresponding to a particular view angle (or range of view angles) of the preliminary panoramic image is problematic, and in response to the determining, generates for display, an indicator for the preliminary panoramic image prompting for the camera of the device to be repositioned to the particular view angle (or range of view angles) of the preliminary panoramic image that was determined to be problematic. The system may receive additional image data from the camera repositioned to the particular view angle (or range of view angles), and generates for display a modified panoramic image using at least a portion of the additional image data to modify the portion of the preliminary panoramic image that is problematic.

In some embodiments, a portion of the preliminary panoramic image is determined (e.g., automatically) to be problematic based on an analysis of the preliminary panoramic image performed by a device or system (e.g., without requiring user input). In some embodiments, a portion is determined to be problematic by detecting regional variations that indicate large areas that are changing while others remain consistent. In some embodiments, a portion of the preliminary panoramic image is determined to be problematic if there is a problem in holography generation, homography generation, failed feature points matching or lack of feature points in one or more images (e.g., difficulties in stitching neighboring images). In some embodiments, holography generation may be used to generate holograms from images with depth data for creating a 3D panorama. In some embodiments, homography generation may be used to shift images from one view to another view for stitching images together in a panorama. Feature points may be used to stitch a panorama together. For example, feature points may be identified in images, and matched across images to stitch images together for a panorama. Failure to match feature points across images or lack of feature points in an image may indicate a problem as feature points may be used to stitch a panorama together. A preliminary panoramic image may be determined to not be problematic if there is no problem in holography generation, homography generation, in matching feature points, or not lacking feature points in one or more images. In some embodiments, a portion of the preliminary panoramic image is determined to be problematic based on a received user input indicating that one or more areas of the preliminary panoramic image is problematic.

In an embodiment, video data is received simultaneously during receiving the image data for capturing the panoramic image. For example, video data and image data are captured simultaneously for the panoramic image. The video data may be used as additional data to modify the portion of the preliminary panoramic image that was determined to be problematic. The video data may be used to identify a portion of the image data to be used in reconciling the portion of the preliminary panoramic image that was determined to be problematic, and the resolution of the video data may be lower than the resolution of the image data for capturing the panoramic image.

In an embodiment, the image data is compared using a correlation function, and the relevant system or device may detect whether corresponding portions of the two or more images vary above a threshold amount. Responsive to detecting that the two or more images vary above a threshold amount, an indicator may be generated for display, prompting for the camera of the device to be moved more slowly or to stop being moved.

In an embodiment, depth data is received simultaneously during receiving image data for capturing the panoramic image, and a point cloud is generated using the depth data. Determining that the portion of the preliminary panoramic image is problematic may comprise detecting excess information in a region in the point cloud and/or detecting one or more holes in the point cloud. For example, one or more holes in the point cloud may be detected by analyzing the density of points in the point cloud and detecting inconsistencies.

In an embodiment, more than one modified panoramic image is generated. For example, a first modified panoramic image and a second modified panoramic image are generated for display based at least in part on the additional image data. The first and second modified panoramic images may be displayed in a user interface as selectable options for storage on the device. The selectable options may be arranged in an order on the user interface based on a quality of continuity of the corresponding panoramic image. The order of the selectable options may be spatial or temporal. A quality of continuity may be based on a number of breaks or discontinuity detected during a final stitching phase of the varying/moving objects. For example, a panorama with a higher quality of continuity indicates a lower number of discontinuities detected than a panorama with a lower quality of continuity. In one example, the order of multiple options is spatially arranged in a user interface so the first option has no discontinuity or a least number of discontinuities of the panorama options. In another example, the order of multiple options is shown sequentially (e.g., presented one at a time) to a user in the user interface, with the first option shown with no discontinuity or a least number of discontinuities of the panorama options. The user interface may include a corresponding preview option for each of the selectable options to preview the corresponding modified panoramic image.

In an embodiment, an animated image is generated corresponding to the portion of the preliminary panoramic image that is problematic. An animated panoramic image may be generated based on the preliminary panoramic image and the animated image by replacing the portion of the preliminary panoramic image that is problematic with the animated image. For example, an animated panoramic image includes a billboard that displays different content in a scene represented as an animated image.

In an embodiment, while additional image data is received from the camera being repositioned to the particular view angle of the preliminary panoramic image that was determined to be problematic, a preliminary modified panoramic image based at least in part on the additional image data is generated for display.

In an embodiment, the current view angle of the camera is detected, and the current view angle of the camera is compared to the particular view angle. The indicator for the preliminary panoramic image may be generated based on the comparison. A view angle of the camera may be measured from an optical axis of the camera at an initial position (e.g., position the camera is in when a device receives a user input to start capture of a panoramic image). For example, an image taken at an initial position of the camera may correspond to a view angle of zero degrees. As the camera is rotated, the current optical axis of the camera may be measured to the initial optical axis of the camera. A current view angle of the camera may be detected using an IU and a magnetometer. In some embodiments, a relative view angle of the camera is determined to the particular view angle using optical interference based on the image captured.

In an embodiment, when the portion of the preliminary panoramic image is determined to be problematic, the portion is highlighted and a selectable option to reconstruct the portion of the preliminary image is generated for display. Inpainting may be used to reconstruct the portion of the preliminary panoramic image that is problematic.

In an embodiment, a 2D guidance indicator may be generated for display prompting for the camera to be repositioned in a horizontal or vertical direction to generate a 2D panoramic image. A panoramic image may have a wide view in a horizontal direction, and may be generated from images captured from panning a camera in the horizontal direction. A 2D panoramic image may have a wider view in a vertical direction than a panoramic image generated from images captured from panning a camera only in a horizontal direction. For example, a 2D panoramic image may be generated from images captured from panning a camera in both a horizontal and a vertical direction. After a first horizontal panning of a camera, the camera may be moved in the vertical direction and panned in the horizontal direction, to capture additional data in the vertical direction for a 2D panoramic image. The camera may be moved and panned one or more additional times to capture additional data in the vertical direction for a 2D panoramic image. A 2D panoramic image may be generated by stitching captured images in both a horizontal and a vertical direction.

In some embodiments, one or more additional devices are used to capture a panoramic image. For example, a device (e.g., personal computer, smartphone, tablet, first device) is connected to one or more additional devices with cameras (e.g., drones with cameras, autonomous vehicles with cameras, second device #1, second device #2, . . . second device #n), and the one or more additional devices are controlled by the device. The one or more additional devices may be used to select a first and a second position for capturing a panoramic image and/or may be used to capture the panoramic image. In some embodiments, the first device is a personal computer, a smartphone, tablet, or any suitable computing device that is connected to one or more additional devices with cameras. In some embodiments, the first device is a vehicle (e.g., autonomous vehicle or self-driving vehicle with a deep learning graphics processing unit (GPU)). In some embodiments, the vehicle includes multiple cameras and instructs the multiple cameras to capture a panoramic image. In some embodiments, the vehicle may instruct other surrounding vehicle cameras to capture a panoramic image. For example, the first vehicle determines that image data is missing from a particular angle or range of angles, and requests at least one second vehicle to capture additional image data from the particular angle or range of angles. With the additional image data, the first vehicle may determine full situational awareness.

In an embodiment, one additional device (e.g., drone with camera, another camera of a same vehicle or another vehicle, second device #1) is used to capture a panoramic image. A device (e.g., first device) may receive a user input that indicates a first position and a second position for capturing the panoramic image. For example, the device instructs the additional device with a camera to position the camera at the first position. The device may receive a user input that indicates a selection of the first position of the second device. The device may instruct the additional device to position the camera at the second position. The device may receive a user input that indicates a selection of the second position of the additional device. The device may instruct the additional device to position the camera to the first position and pan the camera to the second position. The device may receive first data from the camera. The device may generate for display a preliminary panoramic image based on the first data. The device may determine that a portion corresponding to a particular view angle of the panoramic image is problematic and instruct the additional device to reposition the camera to the particular view angle. The device may receive second image data from the camera repositioned to the particular view angle, and generate for display a modified panoramic image using at least a portion of the second image data to modify the portion of the preliminary panoramic image that is problematic.

In an embodiment, multiple additional devices (e.g., drones with cameras, second device #1, second device #2, . . . second device #n) are used to capture a panoramic image. A device (e.g., first device) may receive user input indicating a first position and a second position for capturing the panoramic image. For example, the device instructs a first additional device with a first camera to position the first camera at the first position. The device may receive a user input that indicates a selection of the first position of the first additional device. The device may instruct a second additional device with a second camera to position the second camera at the second position. The device may receive a user input that indicates a selection of the second position of the second additional device. The device may determine a first path for the first additional device based on the first position and the second position for capturing the panoramic image. The device may determine a second path for the second additional device based on the first position and the second position for capturing the panoramic image. The device may instruct the first additional device to position the first camera along the first path, and the second additional device to position the second camera along the second path. The device may receive first data from the first camera, and second data from the second camera. The device may generate for display a preliminary panoramic image based on the first data and the second data. The device may determine that a portion corresponding to a particular view angle of the preliminary panoramic image is problematic and instruct at least one of the first additional device or the second additional device to reposition at least one of the first camera or the second camera to the particular view angle. The device may receive third image data from the at least one of the first camera or the second camera repositioned to the particular view angle, and generate for display a modified panoramic image using at least a portion of the third image data to modify the portion of the preliminary panoramic image that is problematic.

In one embodiment, a user input is received to set optical characteristics and boundaries for capturing a virtual panoramic image in a virtual environment. The capture of the virtual panoramic image in the virtual environment may be reconstructed using a virtual camera with the set optical characteristics to capture an area indicated by the set boundaries. The captured 3D scene may be projected on a 2D plane to generate the virtual panoramic image. The user input may include head motions to select four points representing a capture plane. The user input may include a controller input to select four points representing a capture plane. The user input may include a tracked eye gaze to select four points representing a capture plane. The user input may include hand gestures to select four points representing a capture plane. The user input may include a selected focal distance to set a focal distance of the virtual camera.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 9B is a flowchart of an illustrative process to improve image quality of a panoramic image, in accordance with some embodiments of this disclosure;

DETAILED DESCRIPTION

Figure 1A:
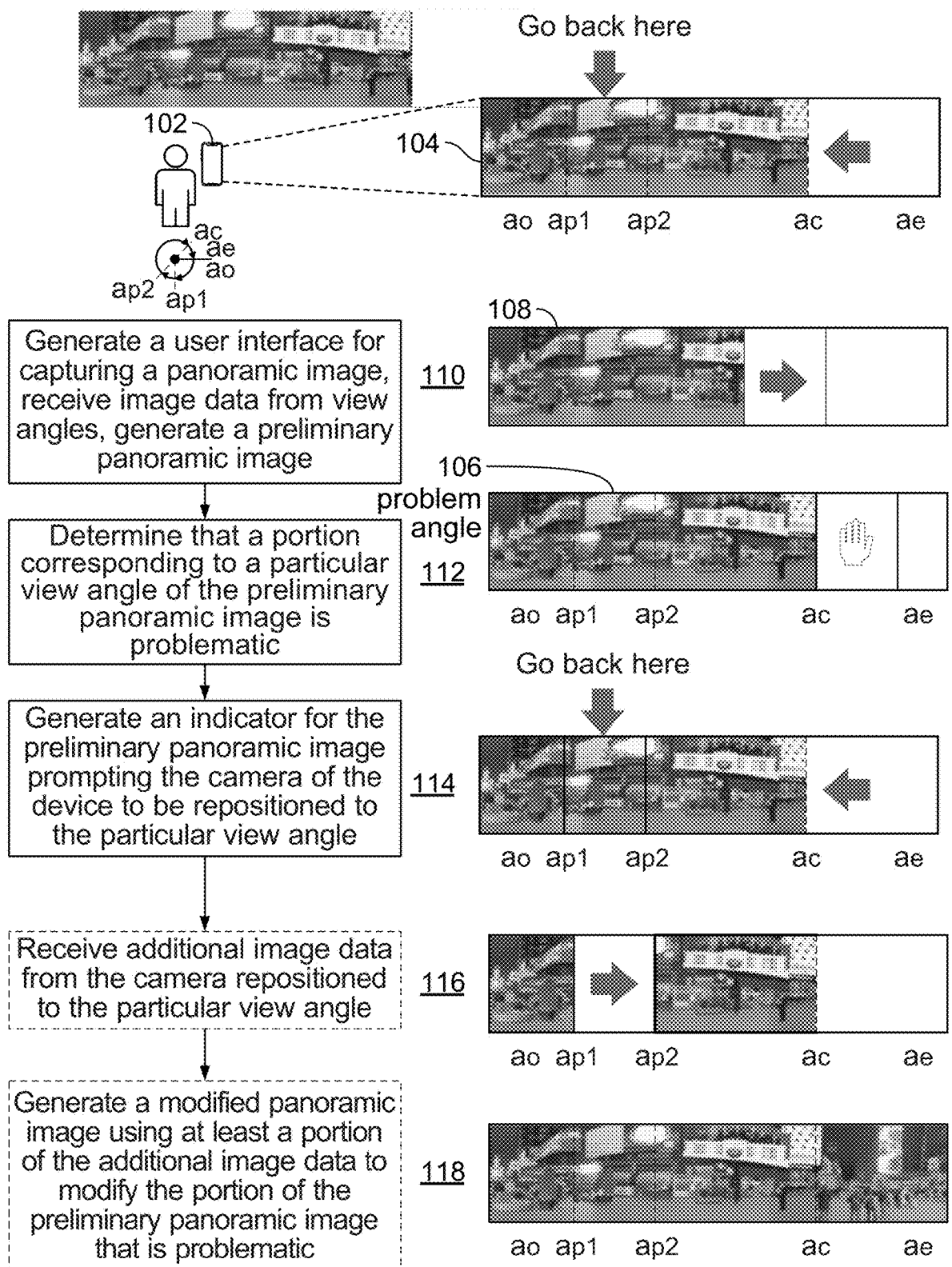
FIG. 1A shows an example method to improve image quality of a panoramic image, in accordance with some embodiments of this disclosure.

Panorama photography is emerging in popularity. Electronic devices with a camera, such as mobile phones, may include options to create panoramic shots by slowly moving a camera of the mobile phone to point towards a panoramic landscape. A series of shots or images may be taken by the camera of the device, and the device may stitch the images together to create the panorama. The device may perform the stitching and cropping of the images so that a user does not have to align the images or remove unwanted portions of the images to generate the panorama.

In some approaches, a system may build or stitch a panorama from several still pictures of the same subject taken at different angles. For example, a software package may build the panorama offline. As another example, an electronic device (e.g., Android or iPhone smartphone models) may perform on-device stitching. The on-device stitching function may be available as a camera mode, and may capture either live videos and/or a series of stills as a camera is panned at different angles towards the subject of the panorama shot.

In some approaches, a photo application may display in a user interface of an electronic device a directional arrow to guide a position of a camera of the electronic device and show a preview of the recomposed (stitched) panorama so far. The photo application may receive a user input such as a tap of a control (e.g., shutter button) to signal the end of the shot. The photo application may store various images and/or live videos (if any) during the shot. The photo application may then analyze and use stitching methods to generate the panorama and save the panorama in a camera folder of a user.

In some approaches, a panorama image may be created based on multiple images of the same scene taken at varying angles. However, between each take (images), the scene may have changed. Similarities in various images may be used to build an appropriate stitch, and moving objects may be filtered out as noise. However, if moving objects are prevalent in the scene, the moving objects may create ghosting or similar artifacts in a stitched panorama. For example, moving objects appear in different positions that cause ghosting artifacts in overlapping areas between images. A moving object may appear blurry, giving the moving object a ghosted appearance.

In one approach, a method identifies ghosts in images and replaces them by one instance of each of the ghosted objects. An example algorithm that may be applied is described by Uyttendaele, Matthew et al. "Eliminating ghosting and exposure artifacts in image mosaics." Proceedings of the 2001 IEEE Computer Society Conference on Computer Vision and Pattern Recognition. CVPR 2001 2 (2001): II-II, which is herein incorporated by reference in its entirety. The method may identify regions where input images are not static and differ across images. This method may work well for small objects (e.g., people or vehicles) that do not occupy a large portion of the scene, but may not work well if an object occupies a large portion of the scene.

In one approach, a method detects moving objects in an image and blends the corresponding images with one instance of the object. An example algorithm that may be applied is described by Murodjon, Abdukholikov and Taeg Keun Whangbo. "A method for manipulating moving objects in panoramic image stitching." 2017 International Conference on Emerging Trends & Innovation in ICT (ICEI) (2017): 157-161, which is herein incorporated by reference in its entirety. This method may use an algorithm that is more efficient for a mobile device. The method may work well for an object occupying a relatively small portion of the scene and moving, not varying.

In one approach, a method identifies moving elements or objects in various takes and instead of filtering them out or replacing them by one unique instance of the moving object, keeps them for artistic purposes, creating an image in which multiple non-ghosted versions of the moving object exist. For example, if the speed of the moving object and the duration and frequency of captured images for a panorama are synchronized, the resulting panorama is a combined time lapse and panoramic image.

In one approach, a method adds videos to an image to enhance the process. For example, video is used as an additional means to build a stitched panorama.

In some embodiments, a system improves the panorama stitching capabilities of camera devices by detecting moving or varying parts of a scene and generating a notification on a user interface to inform the user to spend more time on a particular section of the scene or to go back to a particular section of the scene if unreconcilable breaks are detected in the overall scene. In some embodiments, various methods improve the quality of a panoramic shot and improve user experience for creating a panoramic image. In some embodiments, methods automate secondary devices such as drones in the creation of panoramas. In some embodiments, methods are applicable for VR panoramas and 3D scan creation.

In one embodiment, a camera application detects inconsistencies in scene pixels on the plurality of images it captures. Unlike the case in which there are a finite number of shots for a panorama and for a same angle only having one shot, the camera application may keep a history of shots that have been captured by the camera and have multiple shots for a same angle of the panorama. Instead of selecting one instance and eliminating other instances, the method may keep all instances of the varying object in memory and perform a sub stitch of the instances using a combination of what was captured. For a varying image object in a panorama such as a billboard display that changes over time, a single shot may not provide enough information to correct for the changing billboard display, and a history of what is captured can be used to improve the stitch of the panorama. For example, when a subject changes on the billboard display, the images may be decorrelated, so a history of captured information can help improve the panorama by stitching using images that may not have been correlated with each other.

In some embodiments, a camera application, while capturing the panorama shot, also captures video of the scene to get a better coverage of the varying parts of the panoramas. For example, also capturing video for each angle adds a large volume of data, so chances of finding a good correlation across the different angles of capture is higher than just taking one shot per capture, per angle.

In some embodiments, a camera application generates a notification for a user to change the orientation of the camera to capture moving objects that do not fit in one orientation. For example, when capturing the panorama in portrait mode, the application may detect varying objects within an angle span that exceed what can be captured in portrait mode and may guide a user to switch to landscape mode for that particular section of the panorama.

In one embodiment, videos are captured in low resolution in parallel of the high-resolution stills and used to reconcile the moving/varying still to form a consistent panorama. For example, this is an optimization of a process to avoid capturing a large amount of data in situations where data capture is limited. This may be a way to select which shot (still) in the panorama that is selected (e.g., for improving a panoramic image) using low-resolution as a guide, not as a reconstruction. In some embodiments, multiple cameras are capturing images (e.g., wearable cameras, autonomous vehicles (AVs) with cameras, cameras in a movie studio, professional cameras in a capture scenario), and a low-resolution video is used to decide which one is the best or better alternative. In some embodiments, a user may choose the best or better option, or direct a camera to be moved to a position. In some embodiments, spatial multiplexing is used. For example, spatial multiplexing may be used to receive image data and/or video data from different sources at the same time to the same device.

FIG. 1A shows an example method to improve image quality of a panoramic image, in accordance with some embodiments of this disclosure. In one embodiment, while the user is panning a camera to build a panorama, the application determines it cannot generate a proper stitch and detects breaks of image continuity in the resulting panorama. The application then informs the user to go back to an area of interest to gather more images. For example, while a camera of an electronic device 102 is panned through angles $a_o$ to $a_c$ to generate a panoramic image, a camera application determines that it cannot generate an appropriate stitch, notifies the user of a problem area, and directs the user to go back to the problem area to gather more images to improve the panoramic image. Although FIG. 1A (and other FIGs. showing electronic devices in this disclosure) shows a mobile phone as the electronic device 102, any suitable electronic device may be used. For example, electronic device 102 may be a camera, laptop, tablet, or an extended reality (XR) headset (e.g., augmented reality, (AR), virtual reality (VR), and mixed reality (MR) environment) headset.

At 110, a camera application generates a user interface for capturing a panoramic image. The system receives image data from view angles and generates a preliminary panoramic image 108.

At 112, the camera application determines that a portion corresponding to a particular view angle of the preliminary panoramic image is problematic. For example, the portion of the preliminary panoramic image that is problematic includes an image of a billboard that is varying (e.g., improperly stitched). The camera application may determine the portion corresponds to a particular view angle 106 (e.g. problem angle). An image captured at the particular view angle 106 may correspond to the portion of the preliminary panoramic image that is problematic. In some embodiments, the camera application determines the problem angle 106 corresponds to a range of view angles, $a_{p1}$ to $a_{p2}$. In some embodiments, the camera application determines a range of view angles, and the plurality of images captured from the range of view angles correspond to the portion of the preliminary panoramic image that is problematic.

At 114, the camera application generates an indicator for the preliminary panoramic image prompting the camera of the device to be repositioned to the particular view angle. In some embodiments, the camera application generates an indicator for the preliminary panoramic image prompting the camera of the device to be repositioned to a range of view angles.

At 116, the camera application receives additional image data from the camera repositioned to the particular view angle. In some embodiments, the camera application receives additional image data from the camera repositioned to a range of view angles. In some embodiments, the camera application reconstructs the panorama in real time and displays it as a preview to the user as the user starts taking new shots in the problematic zones.

At 118, the camera application generates a modified panoramic image using at least a portion of the additional image data to modify the portion of the preliminary panoramic image that is problematic. For example, when the camera is moved to the problem angle 106, a portion of the billboard is included so that additional image data captured includes one or more images displayed on the portion of the billboard. The modified panoramic image uses the additional image data to modify the portion of the preliminary panoramic image that is problematic (e.g., uses additional image data to generate a displayed image on the billboard that is not improperly stitched).

Figure 1B:
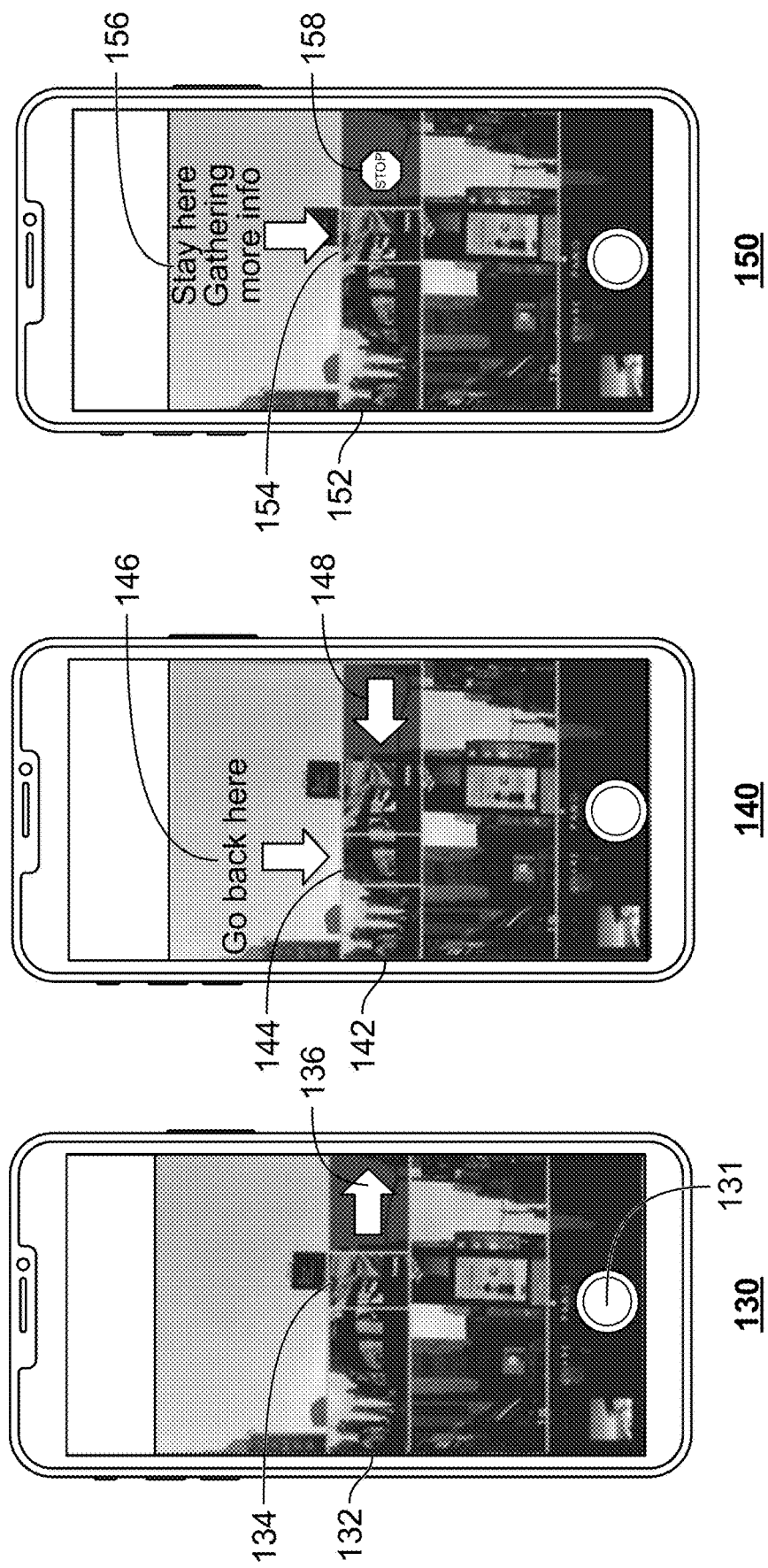
FIG. 1B shows example user interfaces to improve image quality of a panoramic image, in accordance with some embodiments of this disclosure.

FIG. 1B shows example user interfaces to improve image quality of a panoramic image, in accordance with some embodiments of this disclosure.

At 130, an example user interface for capturing a panorama is shown. The user interface includes a button 131 that may be pressed or selected to start and stop the panoramic image capture. The user interface displays a preview 132 of a panoramic image that is being captured and a current camera image 134 that is being captured. In some embodiments, the user interface displays a current view 134 of the camera. The user interface includes an indicator 136 to direct capture of the panoramic image in a horizontal direction.

At 140, an example user interface displays a preview 142 of the panorama image that is being captured, a notification 146 to go back to a particular view angle of the preview panorama that was determined to be problematic, and an indicator 148 to direct the user to position the camera at the particular view angle to gather more images.

At 150, an example user interface shows a notification 156 to the user to indicate that the user should keep a camera at a current position to gather more information to attempt to stitch better. The user interface includes an indicator 158 to direct the user to stop in an area to gather more information. In some embodiments, a notification indicates to a user to slow down, and an indicator directs the user to slow down in the area to gather more information.

In some embodiments, by comparing subsequent captured images running a correlation function or any suitable method to detect image inconsistencies, the camera application detects that the scene being captured is varying above a threshold amount and generates a notification to the user to slow down or to even stop so that a camera can capture multiple images of the same scene in an attempt to get better overall scene overlap.

In some embodiments, progress of stitching is presented as the camera is panned, and image operations such as resizing, flattening, etc. are performed as the panorama shot is being captured.

In some embodiments, the camera application generates a point cloud or a 3D representation of the scene as the camera is panned to build the panorama. The camera application may trigger the requests to pause or go back to a particular view angle if the camera application detects an inconsistency in the level of information collected in certain areas compared to others. For example, the camera application determines a portion of a preliminary panoramic image is problematic by detecting holes in the captured geometry or point cloud, detecting an area of low point density, or by detecting excess information in a region of the point cloud. In some embodiments, the camera application uses LIDAR (Light Detection and Ranging) to generate a 3D point cloud.

In some embodiments, the camera application detects that a feature is partially obscured and/or difficulties in stitching some neighboring images, and provides instructions to go back and reposition the camera so that the feature is not obscured. For example, when performing a 3D capture of Times Square in New York, people are moving around in a scene, and a stationary feature such as a lamp post is obscured by the movement of people. The camera application may generate an indicator to prompt the camera of the device be repositioned to a particular view angle to capture the lamp post, receive additional data from the camera repositioned at the particular view angle, and use the additional data to remove people obscuring the lamp post from a generated panoramic image.

Figure 2:
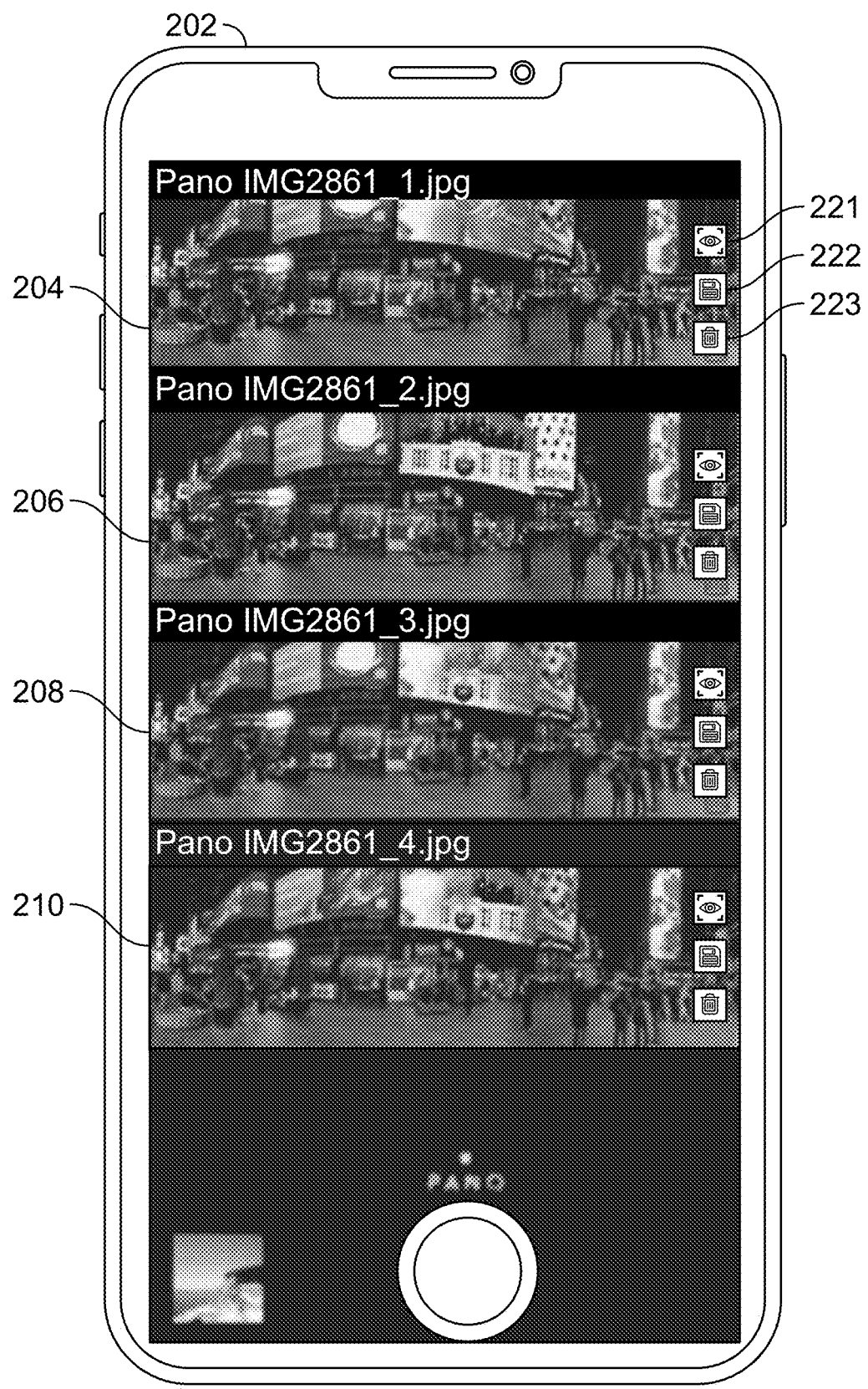
FIG. 2 shows an example user interface to display panoramic image options of versions of a panoramic image based on different stitching of same captured images, in accordance with some embodiments of this disclosure.

FIG. 2 shows an example user interface to display panoramic image options of versions of a panoramic image based on different stitching of same captured images, in accordance with some embodiments of this disclosure. For example, a camera application generates multiple panoramas corresponding to multiple "stitches." Each panorama may represent the various consistent states of the varying/moving objects. Each state may have a limited number of breaks/discontinuities detected during the final stitching phase. The camera application may present all these panoramas to the user, and the user can select which ones to keep. The camera application may order the panoramas by continuity quality. For example, the camera application orders the panoramas based on the number of breaks/discontinuities detected during the final stitching phase. The order of the selectable options may be spatial or temporal. The camera application may allow the user to preview each of the panoramas before deciding to keep (e.g., save) or discard (e.g., delete) them. FIG. 2 shows an example electronic device 202 (e.g., mobile phone). The user interface displayed on the electronic device 202 includes four panoramic image options 204, 206, 208, and 210 that were generated from captured images. Each panoramic image option includes a preview button 221, a save button 222, and a delete button 223. The example shown in FIG. 2 may show selectable options are ordered spatially by continuity quality. For example, first panoramic image option 204 and second panoramic image option 206 may how a higher quality of continuity (e.g., images in billboards do not appear to be varying) than a third panoramic image option 208 (e.g., image in one billboard appears to be varying) and fourth panoramic image option 210 (e.g., image in two billboards appear to be varying). In some embodiments, a first panoramic image option may show a higher quality of continuity than a second, third, and fourth panoramic image options.

In some embodiments, the videos captured while panning are integrated into the still panoramas to create animated panoramas to be saved as animated pictures (e.g., animated GIFs (Graphics Interchange Format)). For example, in a panorama such as one in Times Square New York, a static panorama can be generated and animation can be added (e.g., changing images of a billboard) to generate an animated panorama. As another example, in a panorama such as one of an ocean, animation can be added (e.g., surfers surfing on the waves) to generate an animated panorama.

In some embodiments, the user is presented with a panorama shot that includes zones that have been improperly stitched. The user can then select or highlight these areas, and the camera application may inform the user to take an extra series of shots to attempt to get better shots for stitching. in some embodiments, a camera application has temporarily stored additional images that can be used to generate a new stitch in the zones (e.g., instead of getting better shots for stitching).

In some embodiments, the camera application guides the users towards an area of concern by recognizing what the camera is pointing at in relation to the improperly stitched panorama stored on the device that it is trying to gather more data to correct. In some embodiments, the camera application identifies an area of concern by detecting difficulties in stitching some neighboring images.

Figure 3:
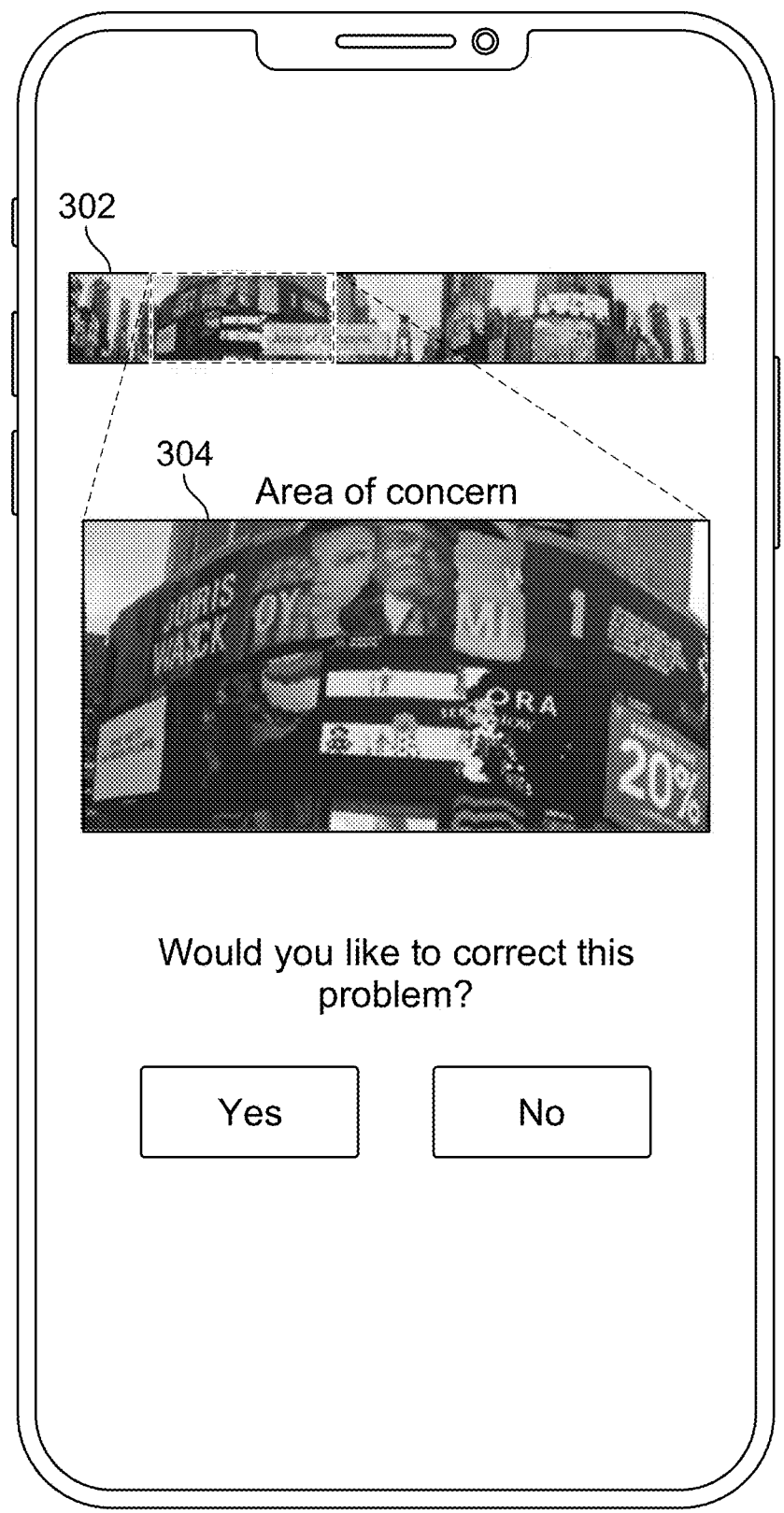
FIG. 3 shows an example user interface to identify a problematic area in a panoramic image and options regarding whether to address the problem, in accordance with some embodiments of this disclosure.

FIG. 3 shows an example user interface to identify a problematic area in a panoramic image and options regarding whether to address the problem, in accordance with some embodiments of this disclosure. In one embodiment, a camera application highlights after the capture, zones that may have been improperly stitched in a panorama shot and offers to reconstruct them. For example, the camera application may detect zones that have been improperly stitched using correlation, edge detection, or any suitable method to detect discontinuity in the picture. The reconstruction can be based on inpainting using generative μl methods. As shown in FIG. 3, a large portion of the scene being shot varies, and the camera application highlights the area of concern 304 in the stitched panorama image 302. For example, the area of concern 304 is where a video wall is changing while shots were being taken of the panorama, and the camera application may not generate a proper stitch. The camera application highlights the area of concern 304 and offers to reconstruct the area. The camera application displays a message in the user interface "Would you like to correct this problem?" and displays "Yes" and "No" input buttons for selection.

Figure 4A:
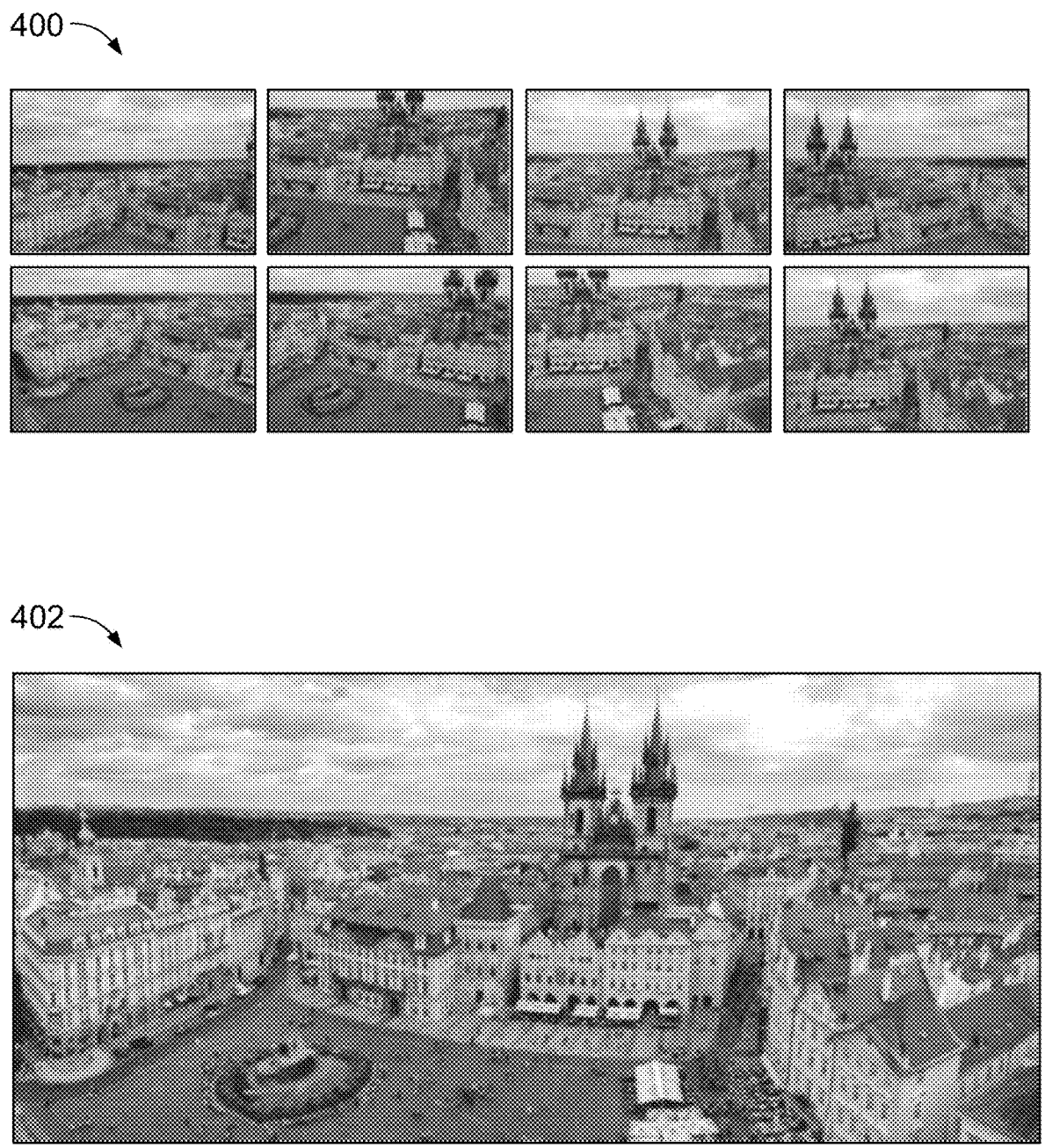
FIG. 4A shows an example of a 2D panoramic image formed by a collection of images, in accordance with some embodiments of this disclosure.

FIG. 4A shows an example of a 2D panoramic image formed by a collection of images, in accordance with some embodiments of this disclosure. For example, a set of eight images 400 are stitched together to form a 2D panoramic image 402.

Figure 4B:
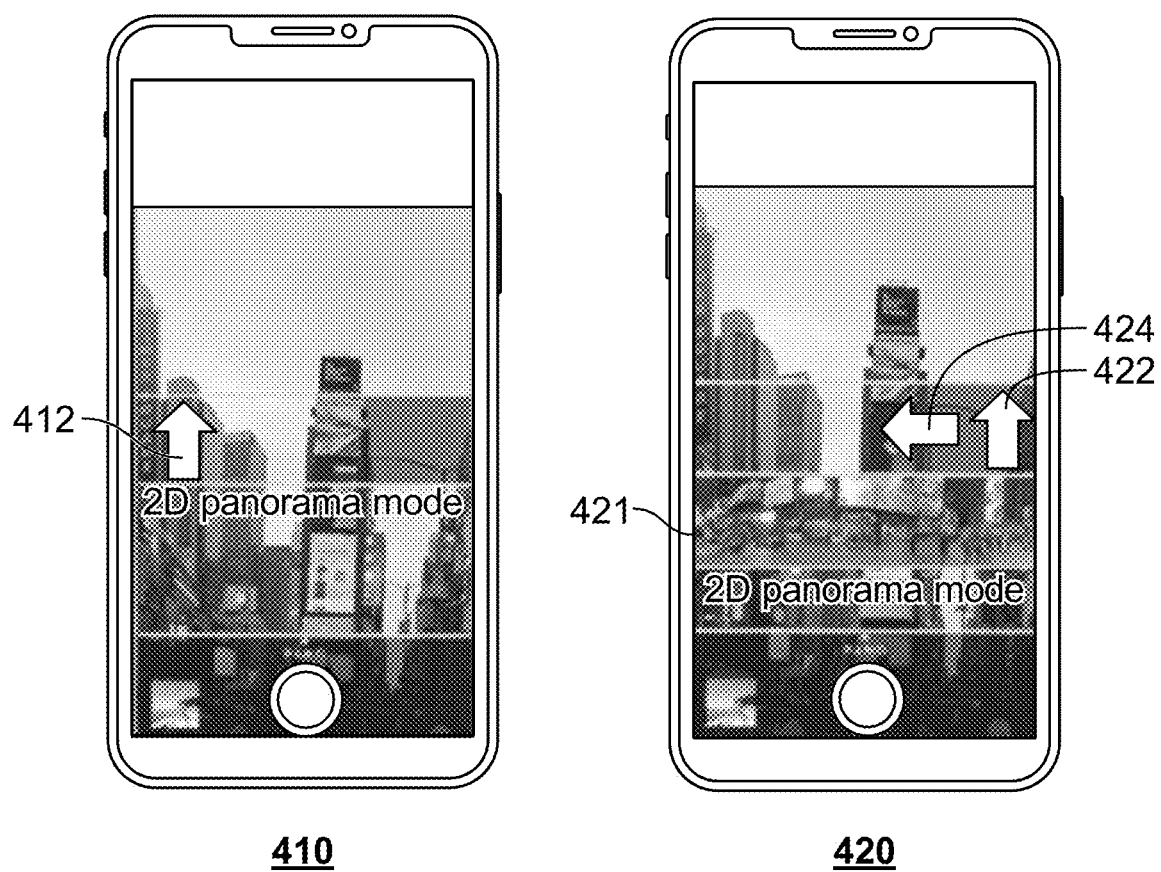
FIG. 4B shows example user interfaces to perform 2D panoramic image collection, in accordance with some embodiments of this disclosure.

FIG. 4B shows example user interfaces to perform 2D panoramic image collection, in accordance with some embodiments of this disclosure. In some embodiments, a camera application supports a vertical panning direction in addition to horizontal and performs 2D stitching on-device. For example, the camera application detects an initial movement direction and records the angular coverage; from the angular coverage the application can infer the number of passes necessary to cover the overall scenery.

At 410, the camera application detects a vertical movement and switches the shoot into 2D panorama mode. For example, switching into 2D panorama mode, the user interface may display a notification that it is in 2D panorama mode, and display an indicator 412 to indicate the movement of the camera in the vertical direction. In some embodiments, the indicator 412 is displayed to guide the user to move the camera in the vertical direction.

At 420, the camera application detects a vertical movement after a horizontal pan and guides the user to perform another pass in the opposite horizontal direction. After a horizontal pan, the camera application may display a preliminary panorama image 421. The user interface may indicate it is in 2D panorama mode, display an indicator 422 indicating the detected vertical movement after a horizontal pan, and display an indicator 424 to guide the user to perform another pass in the opposite horizontal direction. In some embodiments, the indicator 422 is displayed to guide the user to move the camera in the vertical direction.

Figure 5:
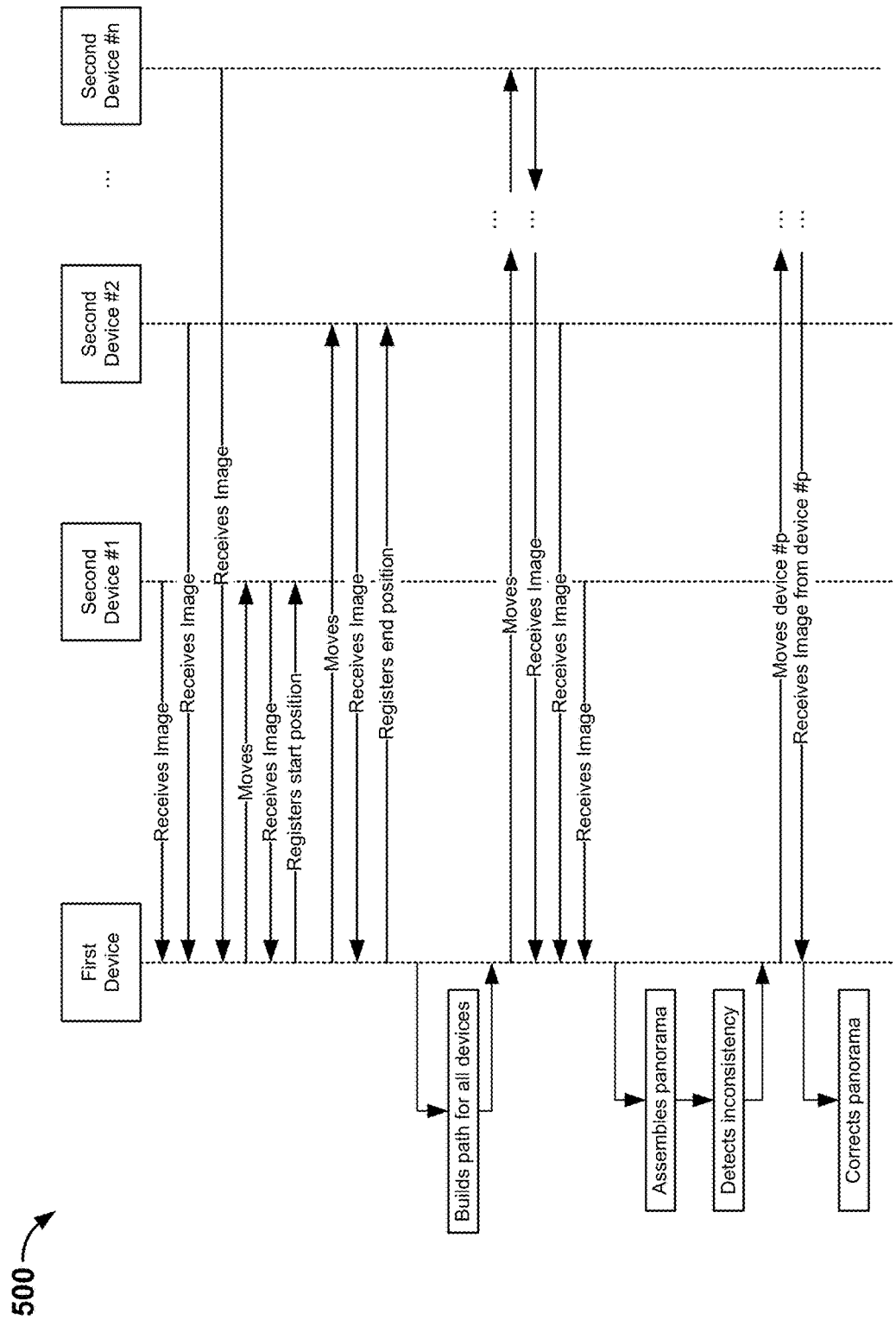
FIG. 5 shows an example sequence diagram of a multi-device panorama shot, in accordance with some embodiments of this disclosure.

FIG. 5 shows a sequence diagram of the multi-device panorama shot, in accordance with some embodiments of this disclosure. In an embodiment, a first device (e.g., a device) is connected to a plurality of second devices (e.g., additional devices, first additional device, second additional device) each at least composed of one camera. Illustratively, the first device can be a smartphone or a laptop and the plurality of second devices can be one drone or a fleet of drones. For example, the first device receives a video feed from each of these second devices and can instruct them to move and pan using a control interface. In some embodiments, the first device is an autonomous vehicle. In some embodiments, the plurality of second devices are autonomous vehicles.

A user can select a starting point for a panorama by moving one of the plurality of second devices (e.g., Second Device #1) into that position and the ending point of a panorama by moving another device of the plurality of second devices (e.g., Second Device #2) into that position. In some embodiments, if there is only one second device, then that second device (e.g., Second Device #1) can be moved from its starting position to register the end position.

The first device then computes a path and panning scenario for each of the plurality of second devices (e.g., Second Device #1, #2, . . . . #n) to generate a series of shots and reconstruct the panorama based on the images it receives from the plurality of second devices as they move and pan into their instructed position. For simplicity, FIG. 5 shows a move instruction generated only for Second Device #n, however move instructions are generated for each of the second devices (e.g., Second Device #1, #2, . . . . #n).

If the first device detects holes in the stitch or inconsistent elements that may have moved during the shot, the first device instructs a subset of the plurality of second devices (e.g., Second Device #p) to move into position and take a series of shots to correct the situation. The resulting panorama may be available for visualization on the first device.

In some embodiments, one or more of the disclosed techniques are applied to volumetric capture cameras (e.g., used at events, sports events, music events, etc.) to create a panoramic image during an event. For example, a souvenir panoramic image is created of a user at an event. The panoramic image may include a jumbotron and an image of the user displayed in a jumbotron at the event.

Figure 6:
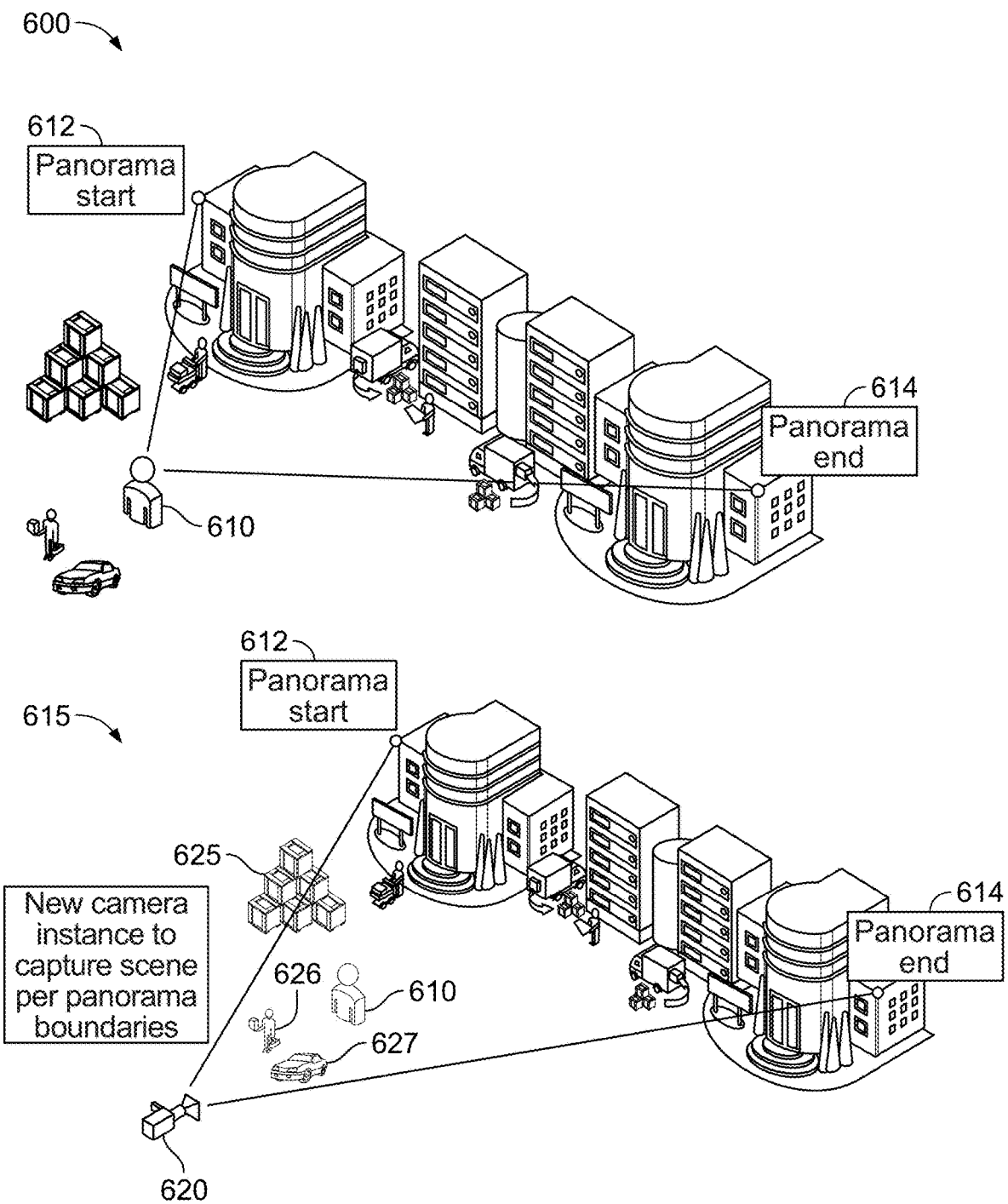
FIG. 6 shows an example process of panoramic capture in a VR setting by setting boundary of capture and generation of the capture scene, in accordance with some embodiments of this disclosure.

FIG. 6 shows an example 600 demonstrating the process of capture of panorama in VR setting by setting boundary of capture and generation of the capture scene, in accordance with some embodiments of this disclosure. In an embodiment, a user generates a panorama in a VR setting by activating an image capture application. A user may move their head up and down and left and right to set boundaries of the capture. Example 600 shows a user 610 indicating a panorama start 612 and a panorama end 614. Although example 600 shows horizontal boundaries of capture, in other examples there may be vertical boundaries of capture, or both horizontal and vertical boundaries of capture. In one example, instead of two points of a panorama start 612 and a panorama end 614 being shown, there may be four points indicated by the user to represent the capture boundary.

Example 615 shows generation of the captured scene of the panorama image. For example, during the capture, the application is recording the position and geometry of all objects in the field of view of the user 610. A preview of the captured panorama (or 360-degree image) may be presented to the user as a non-intrusive overlay. In some embodiments, once the user indicates they want to end the capture, the application reconstructs the capture scene by: creating a virtual camera 620 with optical characteristics and position to capture the marked area; removing objects 625, 626, and 627 from the scene that were not in front of the user 610 when the panorama was captured; and projecting the 3D scene on a 2D plane to generate a panorama image. The virtual camera 620 may be created and positioned based on the panorama request, and the objects 625, 626, and 627 not seen by the user 610 in capture but that are now in the field of view of the virtual camera 620 are removed including the representation of the user 610.

In some embodiments, although the capture of a virtual panorama is instantaneous and may not have problems with moving or varying objects, multiple options of a panoramic image are displayed to a user. For example, there may be options of virtual panoramas captured at different times or options for panoramas with removal of some objects in panorama (e.g., removal of moving object during time of capture, removal of movable objects, or removal of other objects in scene). For example, removal of other objects in a scene may include removal of avatars or other visitors in a virtual scene. As another embodiment, the application can offer options of a panoramic image with varying focal distances captures for the user to save. In one embodiment, a user can indicate a position of a virtual camera for panoramic capture. In some embodiments, a user uses hand gestures to select the capture boundary (e.g., four points representing the capture plane). In some embodiments, any suitable number of points may be selected (e.g., 2 or more) to set boundaries for capturing the virtual panoramic image. In some embodiments, a user input control mechanism (e.g., controller, mouse, joystick) is used to indicate the position of interest. In some embodiments, a user input indicating capture boundary may be a tracked eye gaze. For example, a system may track an eye gaze of a user to determine a position of interest. In some embodiments, any suitable combination of user inputs may be used to select the capture boundary. For example, the user may gaze at a position of interest and use a hand gesture or controller input to indicate a position of interest. In some embodiments, a perspective is expanded in a 2D plane. In some embodiments, a position of the virtual camera moves according to a selected focal distance of capture.

Figure 7:
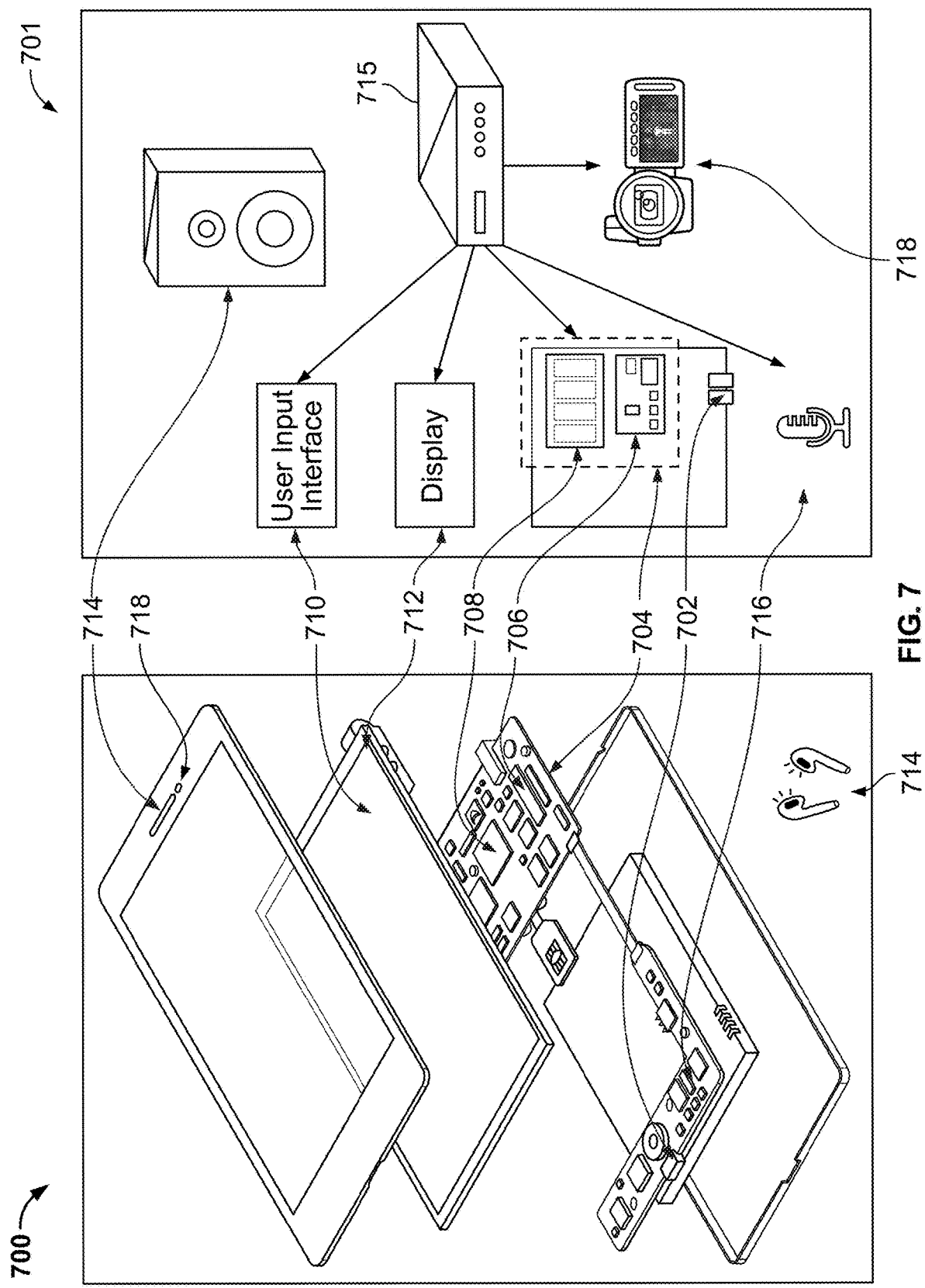
FIG. 7 shows generalized embodiments of illustrative user equipment devices which may perform the functions described herein.
Figure 8:
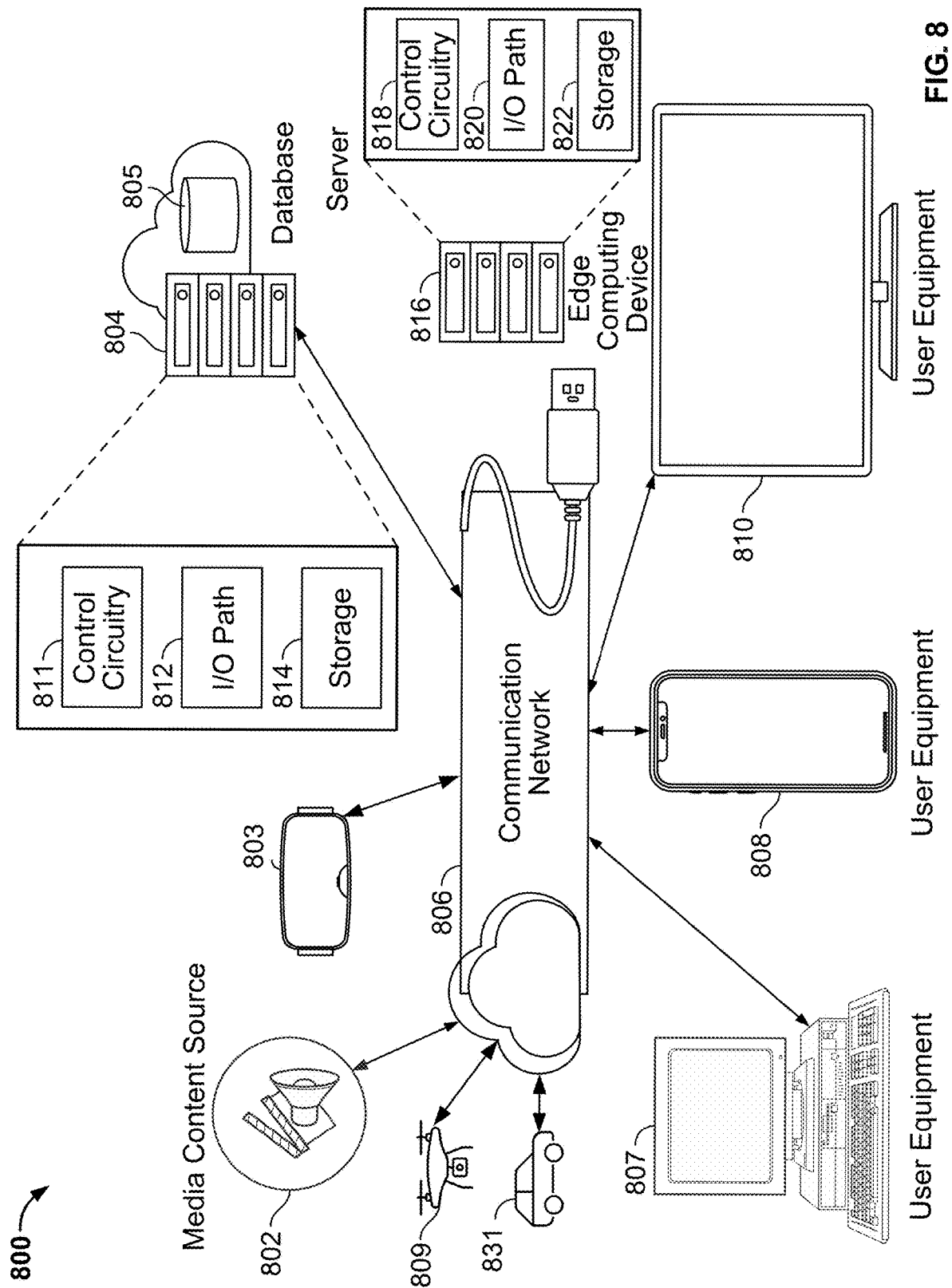
FIG. 8 is a diagram of an example system for creating panoramic images, in accordance with some embodiments of this disclosure

FIGS. 7-8 depict illustrative devices, systems, servers, and related hardware for creating panoramic images, in accordance with some embodiments of the present disclosure. FIG. 7 shows generalized embodiments of illustrative user equipment devices, including a user equipment device 700, which may perform the functions described herein. User equipment device 700 may be a camera, a smartphone device, a tablet, a virtual reality or augmented reality device, or any other suitable computing device. The user equipment device 700 may be similar to the device 102 shown in FIG. 1A, and, in some embodiments, may perform any one or more of the processes or operations described herein as being performed by the device 102. In another example, user equipment device 701 may be a user television equipment system or device. User television equipment device 701 may include computing device 715. Computing device 715 may be communicatively connected to microphone 716, audio output equipment (e.g., speaker or headphones 714), and display 712. In some embodiments, computing device may enable creating a virtual panoramic image in a virtual reality environment. In some embodiments, display 712 may be a television display or a computer display. In some embodiments, computing device 715 may be communicatively connected to user input interface 710. In some embodiments, user input interface 710 may be a remote-control device. Computing device 715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 700 and user equipment device 701 may receive content and data via input/output (I/O) path (e.g., circuitry) 702. I/O path 702 may provide content (e.g., broadcast programming, on-demand programming, Internet content, content available over a local area network (LAN) or wide area network (WAN), and/or other content) and data to control circuitry 704, which may comprise processing circuitry 706 and storage 708. In some embodiments, a user equipment device 700 is a mobile phone, and the mobile phone receives camera data and/or video data via I/O path 702 for capturing panoramic content. A mobile phone may use I/O path or circuitry to output camera and/or video data for display on the mobile phone (e.g., panoramic image). Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing. While one example of a computing device 715 is shown in FIG. 7 for illustration, any suitable computing device having processing circuitry, control circuitry, and storage may be used in accordance with the present disclosure. For example, computing device 715 may be replaced by, or complemented by, a personal computer (e.g., a notebook, a laptop, a desktop), a smartphone (e.g., device 700), a tablet, a network-based server hosting a user-accessible client device, a non-user-owned device, any other suitable device, or any combination thereof.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the camera application stored in memory (e.g., storage 708). Specifically, control circuitry 704 may be instructed by the camera application to perform the functions discussed above and below. In some implementations, processing or actions performed by control circuitry 704 may be based on instructions received from the camera application.

In client/server-based embodiments, control circuitry 704 may include communications circuitry suitable for communicating with a server or other networks or servers. The camera application may be a stand-alone application implemented on a device or a server. The camera application may be implemented as software or as a set of executable instructions. The instructions for performing any of the embodiments discussed herein of the camera application may be encoded on non-transitory computer-readable media (e.g., a hard drive, random-access memory on a DRAM integrated circuit, read-only memory on a BLU-RAY disk, etc.). For example, in FIG. 7, the instructions may be stored in storage 708, and executed by control circuitry 704 of a device 700.

In some embodiments, the camera application may be a client/server application where only the client application resides on device 700, and a server application resides on an external server (e.g., server 804 and/or server 816). For example, the camera application may be implemented partially as a client application on control circuitry 704 of device 700 and partially on server 804 as a server application running on control circuitry 811. Server 804 may be a part of a local area network with one or more of devices 700 or may be part of a cloud computing environment accessed via the internet. In a cloud computing environment, various types of computing services for performing searches on the internet or informational databases, providing capabilities for creating panoramic images, providing storage (e.g., for a database) or parsing data are provided by a collection of network-accessible computing and storage resources (e.g., server 804 and/or edge computing device 816), referred to as "the cloud." Device 700 may be a cloud client that relies on the cloud computing capabilities from server 804 to determine whether processing (e.g., at least a portion of virtual background processing and/or at least a portion of other processing tasks) should be offloaded from the mobile device, and facilitate such offloading. When executed by control circuitry of server 804 or 816, the camera application may instruct control circuitry 811 or 818 to perform processing tasks for the client device and facilitate creating panoramic images.

Control circuitry 704 may include communications circuitry suitable for communicating with a server, edge computing systems and devices, a table or database server, or other networks or servers. The instructions for carrying out the above-mentioned functionality may be stored on a server (which is described in more detail in connection with FIG. 8). Communications circuitry may include one or more wireless transceivers for wireless communications (e.g., via WAN and/or data network such as 5G), a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as camera application data described above. Nonvolatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry, such as one or more analog tuners, one or more MPEG-2 decoders, MPEG-4 decoders, HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 704 may also include scaler circuitry for upconverting and downconverting content into the preferred output format of user equipment 700. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive video data for creating panoramic images. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

Control circuitry 704 may receive instruction from a user by way of user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment device 701. For example, display 712 may be a touchscreen or touch-sensitive display. In such circumstances, user input interface 710 may be integrated with or combined with display 712. In some embodiments, user input interface 710 includes a remote-control device having one or more microphones, buttons, keypads, any other components configured to receive user input or combinations thereof. For example, user input interface 710 may include a handheld remote-control device having an alphanumeric keypad and option buttons. In a further example, user input interface 710 may include a handheld remote-control device having a microphone and control circuitry configured to receive and identify voice commands and transmit information to computing device 715.

Audio output equipment 714 may be integrated with or combined with display 712. Display 712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Audio output equipment 714 may be provided as integrated with other elements of each one of device 700 and equipment 701 or may be stand-alone units. An audio component of videos and other content displayed on display 712 may be played through speakers (or headphones) of audio output equipment 714. In some embodiments, audio may be distributed to a receiver (not shown), which processes and outputs the audio via speakers of audio output equipment 714. In some embodiments, for example, control circuitry 704 is configured to provide audio cues to a user, or other audio feedback to a user, using speakers of audio output equipment 714. There may be a separate microphone 716 or audio output equipment 714 may include a microphone configured to receive audio input such as voice commands or speech. For example, a user may speak letters or words that are received by the microphone and converted to text by control circuitry 704. In a further example, a user may voice commands that are received by a microphone and recognized by control circuitry 704. Camera 718 may be any suitable video camera integrated with the equipment or externally connected. Camera 718 may be a digital camera comprising a charge-coupled device (CCD) and/or a complementary metal-oxide semiconductor (CMOS) image sensor. Camera 718 may be an analog camera that converts to digital images via a video card.

The camera application may be implemented using any suitable architecture. For example, it may be a stand-alone application wholly-implemented on each one of user equipment device 700 and user equipment device 701. In such an approach, instructions of the application may be stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to provide creating panoramic image functionality and perform any of the actions discussed herein. Based on the processed instructions, control circuitry 704 may determine what action to perform when input is received from user input interface 710. For example, movement of a cursor on a display up/down may be indicated by the processed instructions when user input interface 710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the camera application is a client/server-based application. Data for use by a thick or thin client implemented on each one of user equipment device 700 and user equipment device 701 may be retrieved on-demand by issuing requests to a server remote to each one of user equipment device 700 and user equipment device

701. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on device 700. This way, the processing of the instructions is performed remotely by the server while the resulting displays (e.g., that may include text, a keyboard, or other visuals) are provided locally on device 700. Device 700 may receive inputs from the user via input interface 710 and transmit those inputs to the remote server for processing and generating the corresponding displays. For example, device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to device 700 for presentation to the user.

In some embodiments, the camera application may be downloaded and interpreted or otherwise run by an interpreter or virtual machine (run by control circuitry 704). In some embodiments, the camera application may be encoded in the ETV Binary Interchange Format (EBIF), received by control circuitry 704 as part of a suitable feed, and interpreted by a user agent running on control circuitry 704. For example, the camera application may be an EBIF application. In some embodiments, the camera application may be defined by a series of JAVA-based files that are received and run by a local virtual machine or other suitable middleware executed by control circuitry 704. In some of such embodiments (e.g., those employing MPEG-2, MPEG-4, HEVC or any other suitable digital media encoding schemes), camera application may be, for example, encoded and transmitted in an MPEG-2 object carousel with the MPEG audio and video packets of a program.

FIG. 8 is a diagram of an illustrative system 800 for creating panoramic images, in accordance with some embodiments of this disclosure. User equipment devices 803, 807, 808, 810 (e.g., which may correspond to one or more device) may be coupled to communication network 806. For example, user equipment device 808 may be similar to the device 102 shown in FIG. 1A, and, in some embodiments, may perform any one or more of the processes or operations described herein as being performed by the device 102. Devices with cameras, for example, drone 809 and self-driving or autonomous vehicle 831 may be coupled to communication network 806. For simplicity, only one drone 809 or autonomous vehicle 831 is shown; however other embodiments may include any suitable number of devices with cameras (e.g., drones 809 or autonomous vehicles 831). Drone 809 and autonomous vehicle 831 may be controlled by user equipment device (e.g., personal computer or mobile phone). In some embodiments, an autonomous vehicle 831 communicates with multiple cameras in the same autonomous vehicle 831. In some embodiments autonomous vehicle 831 communicates with one or more other vehicle cameras (e.g., cameras of surrounding autonomous vehicles). Communication network 806 may be one or more networks including the Internet, a mobile phone network, mobile voice or data network (e.g., a 6G, 5G, 4G, WiFi, or LTE network), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 994 cables, wireless paths (e.g., Bluetooth, infrared, IEEE 702-11x, etc.), or other short-range communication via wired or wireless paths. The user equipment devices may also communicate with each other directly through an indirect path via communication network 806.

System 800 may comprise media content source 802, one or more servers 804, and one or more edge computing devices 816 (e.g., included as part of an edge computing system). In some embodiments, media content source 802 provides virtual content to a headset 803 or user equipment 807 over network 806. In some embodiments, the camera application may be executed at one or more of control circuitry 811 of server 804 (and/or control circuitry of user equipment devices 803, 807, 808, 810 and/or control circuitry 818 of edge computing device 816). In some embodiments, a camera application executing on headset 803 and enables generation of a virtual panoramic image. In some embodiments, a camera application executing on user equipment 807 enables generation of a virtual panoramic image. In some embodiments, the headset 803 communicates directly with user equipment 807. In some embodiments, a data structure, image data, video data, and/or panoramic image data transmitted via I/O path 702 of FIG. 7 may be stored at database 805 maintained at or otherwise associated with server 804, and/or at storage 822 and/or at storage of one or more of user equipment devices 803, 807, 808, 810.

In some embodiments, server 804 may include control circuitry 811 and storage 814 (e.g., RAM, ROM, Hard Disk, Removable Disk, etc.). Storage 814 may store one or more databases. Server 804 may also include an input/output path 812. I/O path 812 may provide data for creating panoramic images, device information, or other data, over a local area network (LAN) or wide area network (WAN), and/or other content and data to control circuitry 811, which may include processing circuitry, and storage 814. Control circuitry 811 may be used to send and receive commands, requests, and other suitable data using I/O path 812, which may comprise I/O circuitry. I/O path 812 may connect control circuitry 811 (and specifically control circuitry) to one or more communications paths.

Control circuitry 811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 811 executes instructions for an emulation system application stored in memory (e.g., the storage 814). Memory may be an electronic storage device provided as storage 814 that is part of control circuitry 811.

Edge computing device 816 may comprise control circuitry 818, I/O path 820 and storage 822, which may be implemented in a similar manner as control circuitry 811, I/O path 812 and storage 824, respectively of server 804. Edge computing device 816 may be configured to be in communication with one or more of user equipment devices 803, 807, 808, 810 and server 804 over communication network 806, and may be configured to perform processing tasks (e.g., for encoding/decoding) in connection with ongoing processing of video data. In some embodiments, a plurality of edge computing devices 816 may be strategically located at various geographic locations, and may be mobile edge computing devices configured to provide processing support for mobile devices at various geographical regions.

FIGS. 9A, 9B, 10, and 11 are flowcharts of illustrative processes, in accordance with some embodiments of this disclosure. In various embodiments, the individual steps of processes 900, 922, 1000, and 1100 may be implemented by one or more components of the devices and systems of FIGS. 1A-1B,2-3, 4B, and 5-8. Although the present disclosure may describe certain steps of the processes (and of other processes described herein) as being implemented by certain components of the devices and systems of FIGS. 1A-1B,2-3, 4B, and 5-8, this is for purposes of illustration only, and it should be understood that other components of the devices and systems of FIGS. 1A-1B,2-3, 4B, and 5-8 may implement those steps instead.

Figure 9A:
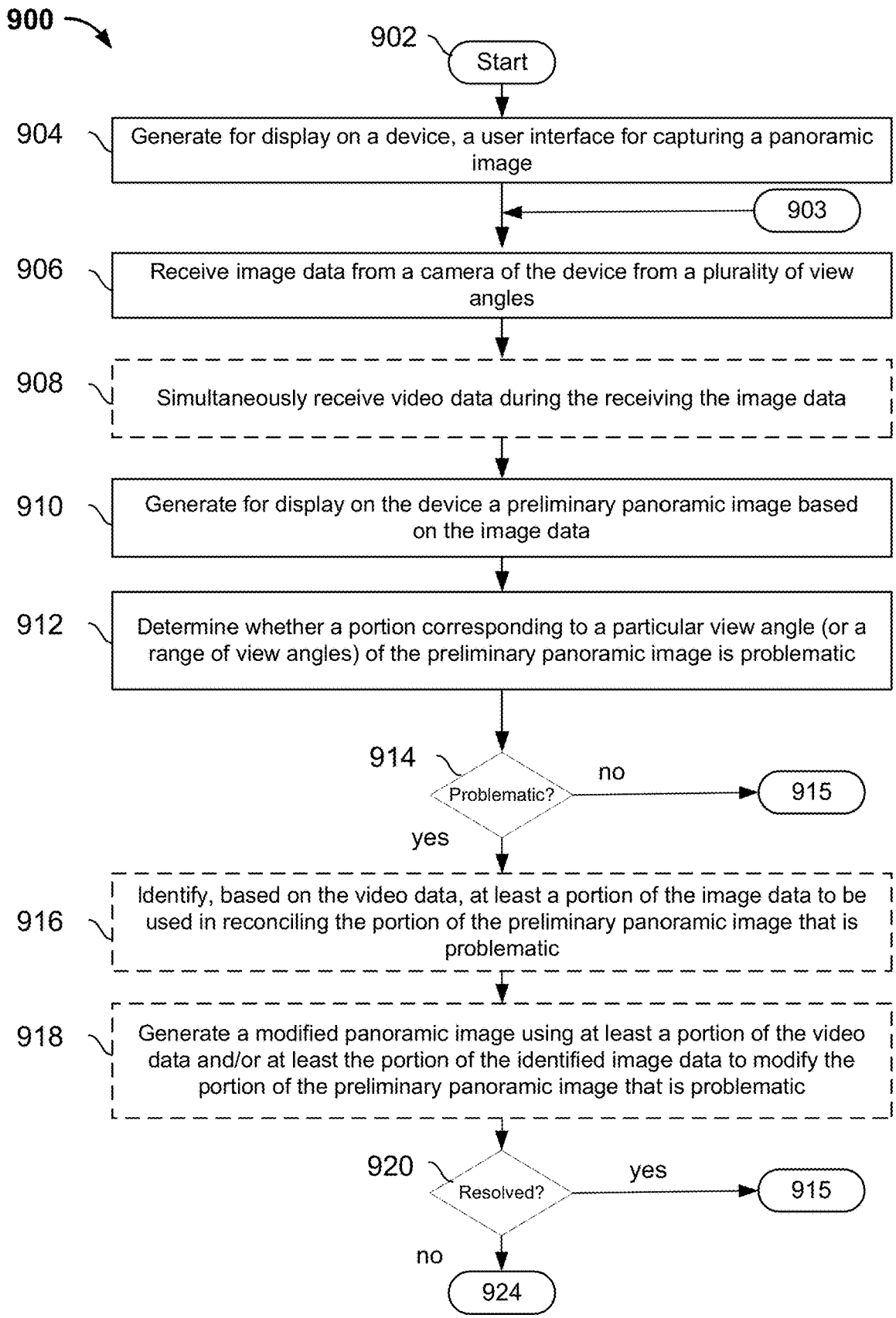
FIG. 9A is a flowchart of an illustrative process to improve image quality of a panoramic image, in accordance with some embodiments of this disclosure.

FIG. 9A is a flowchart of an illustrative process 900 to improve image quality of a panoramic image, in accordance with some embodiments of this disclosure.

At step 902, process 900 begins.

At step 904, control circuitry (e.g., control circuitry 811, control circuitry 818, or control circuitry of any devices 803, 807, 808, or 810) generates, for display on a device, a user interface for capturing a panoramic image.

At step 906, input/output circuitry (e.g., input/output circuitry 712 of FIG. 7) connected to control circuitry receives image data from a camera of the device from a plurality of view angles.

At step 908, input/output circuitry connected to control circuitry simultaneously receives video data during the receiving the image data. In some embodiments, step 908 is optional.

At step 910, control circuitry generates for display on the device a preliminary panoramic image based on the image data.

At step 912, control circuitry determines whether a portion corresponding to a particular view angle (or a range of view angles) of the preliminary panoramic image is problematic.

At step 914, if the portion corresponding to the particular view angle (or range of view angles) is problematic, the process proceeds to 916. If not, the process proceeds to 915. In some embodiments, at step 914, if the portion corresponding to the particular view angle (or range of view angles) is problematic, the process proceeds to 918. In some embodiments, at step 914, if the portion corresponding to the particular view angle (or range of view angles) is problematic, the process proceeds to 920.

At step 916, control circuitry identifies, based on the video data, at least a portion of the image data to be used in reconciling the portion of the preliminary panoramic image that is problematic. In some embodiments, step 916 is optional.

At step 918, control circuitry generates a modified panoramic image using at least a portion of the video data and/or at least the portion of the identified image data to modify the portion of the preliminary panoramic image that is problematic. In some embodiments, step 918 is optional.

At step 920, if the problem with the portion of the preliminary panoramic image is resolved, the process proceeds to 915 (e.g., shown in FIG. 9B). If not, the process proceeds to 924 (e.g., step 924 of FIG. 9B).

FIG. 9B is a flowchart of an illustrative process 922 to improve image quality of a panoramic image, in accordance with some embodiments of this disclosure. In some embodiments, process 922 of FIG. 9B continues from process 900 of FIG. 9A.

At step 924, control circuitry (e.g., control circuitry 811, control circuitry 818, or control circuitry of any devices 803, 807, 808, or 810) generates, for display, an indicator for the preliminary panoramic image prompting the camera of the device to be repositioned to the particular view angle (or the range of view angles) of the preliminary panoramic image that was determined to be problematic.

At step 926, input/output circuitry (e.g., input/output circuitry 712 of FIG. 7) connected to control circuitry receives additional image data from the camera repositioned to the particular view angle (or the range of view angles).

At step 928, control circuitry generates for display, a modified panoramic image using at least a portion of the additional image to modify the portion of the preliminary panoramic image that is problematic.

At step 930, control circuitry generates for display, a first modified panoramic image and a second modified panoramic image based at least in part on the additional image data. In some embodiments, step 930 is optional.

At step 932, control circuitry generates for display, the first modified panoramic image and the second modified panoramic image as selectable options on the user interface for storage. In some embodiments, step 932 is optional.

At step 934, if all images are processed, the process ends. For example, a user may indicate panoramic capture has ended by pressing a button on the user interface. The control circuitry may determine that all images are processed if the captured images from the session of capturing the panoramic image have been processed. If not, the process continues to 903 (e.g., shown in FIG. 9A).

Figure 10:
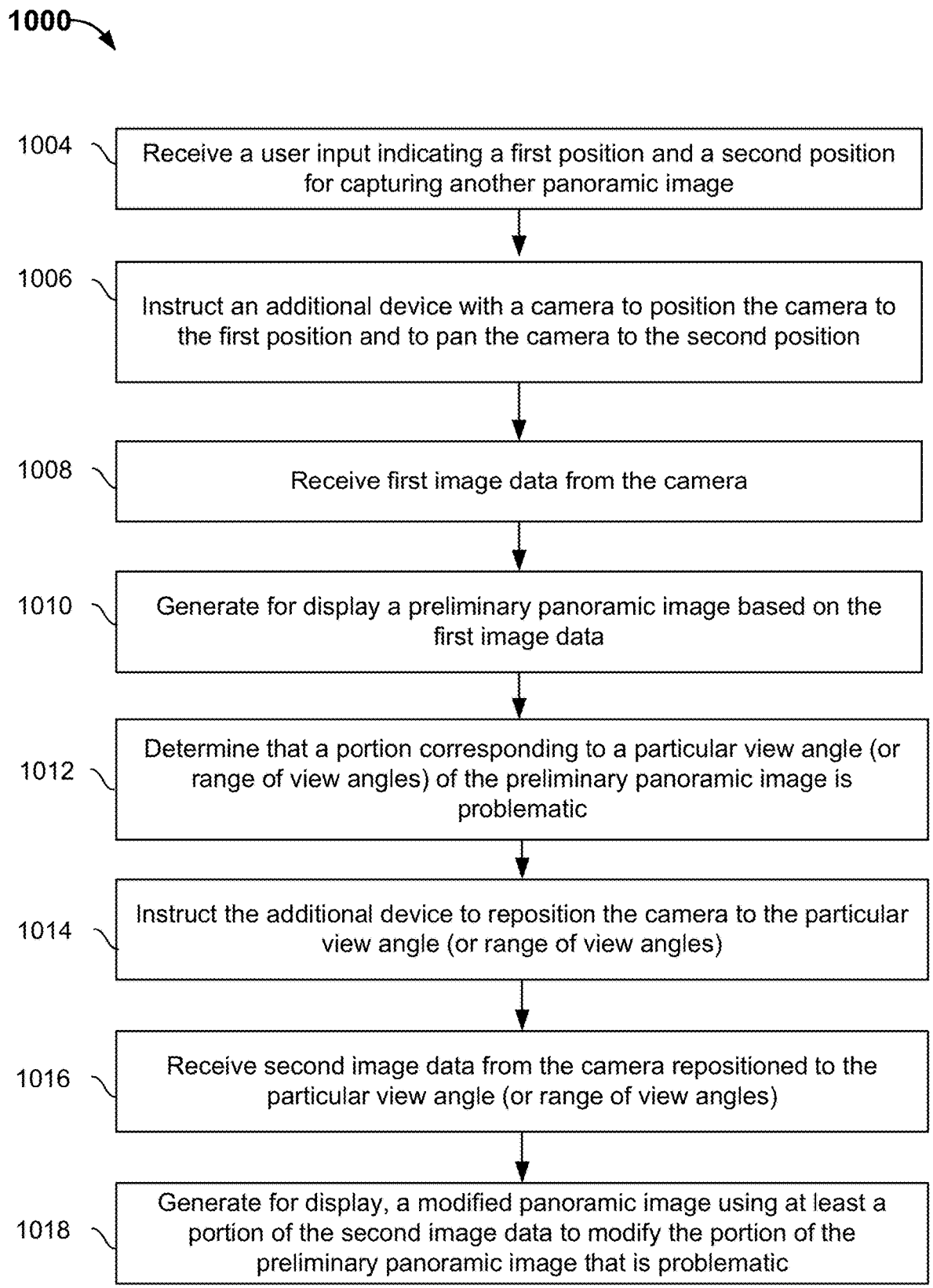
FIG. 10 is a flowchart of an illustrative process for generating a panoramic image using a device, in accordance with some embodiments of this disclosure.

FIG. 10 is a flowchart of an illustrative process 1000 for generating a panoramic image using a device, in accordance with some embodiments of this disclosure.

At step 1004, input/output circuitry (e.g., input/output circuitry 712 of FIG. 7) connected to control circuitry (e.g., control circuitry 811, control circuitry 818, or control circuitry of any devices 803, 807, 808, or 810) receives a user input indicating a first position and a second position for capturing a panoramic image.

At step 1006, control circuitry (e.g., control circuitry 811, control circuitry 818, or control circuitry of any devices 803, 807, 808, or 810) instructs an additional device with a camera (e.g., a drone) to position the camera to the first position and to pan the camera to the second position.

At step 1008, input/output circuitry receives first image data from the camera.

At step 1010, control circuitry generates for display a preliminary panoramic image based on the first image data.

At step 1012, control circuitry determines that a portion corresponding to a particular view angle (or range of view angles) of the preliminary panoramic image is problematic.

At step 1014, control circuitry instructs the additional device to reposition the camera to the particular view angle (or range of view angles).

At step 1016, control circuitry receives second image data from the camera repositioned to the particular view angle (or range of view angles).

At step 1018, control circuitry generates for display, a modified panoramic image using at least a portion of the second image data to modify the portion of the preliminary panoramic image that is problematic.

Figure 11:
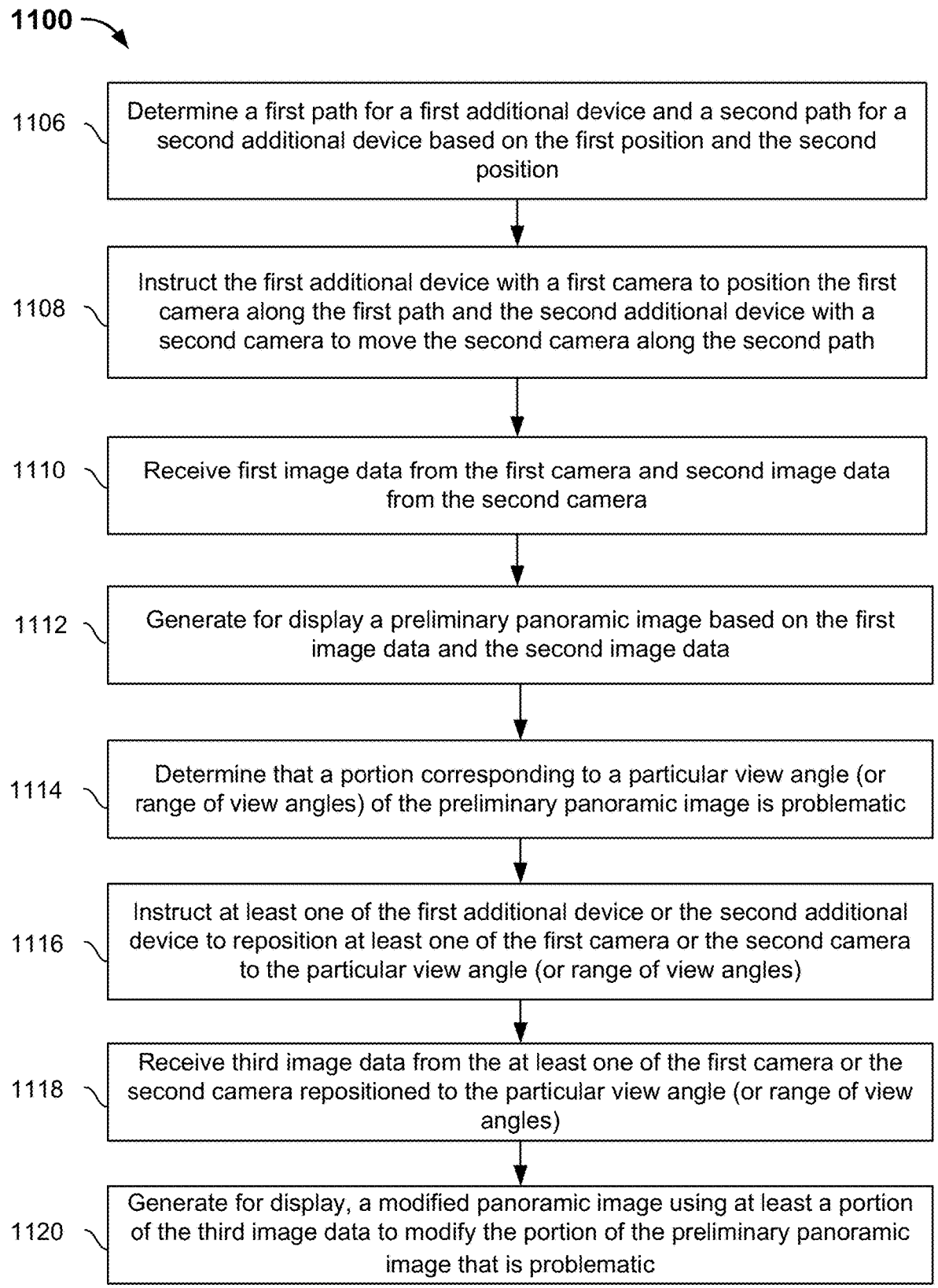
FIG. 11 is a flowchart of an illustrative process for generating a panoramic image using multiple devices, in accordance with some embodiments of this disclosure.

FIG. 11 is a flowchart of an illustrative process 1100 for generating a panoramic image using multiple devices, in accordance with some embodiments of this disclosure. In some embodiments, process 1100 continues from step 1004 of FIG. 10. For example, input/output circuitry (e.g., input/output circuitry 712 of FIG. 7) connected to control circuitry (e.g., control circuitry 811, control circuitry 818, or control circuitry of any devices 803, 807, 808, or 810) receives a user input indicating a first position and a second position for capturing a panoramic image.

At step 1106, control circuitry (e.g., control circuitry 811, control circuitry 818, or control circuitry of any devices 803, 807, 808, or 810) determines a first path for the first additional device and a second path for the second additional device based on the first position and the second position. For example, the first additional device and the second additional device are drones.

At step 1108, control circuitry instructs the first additional device with a first camera to position the first camera along the first path and the second additional device with a second camera to move the second camera along the second path.

At step 1110, input/output circuitry receives first image data from the first camera and second image data from the second camera.

At step 1112, control circuitry generates for display a preliminary panoramic image based on the first image data and the second image data.

At step 1114, control circuitry determines that a portion corresponding to a particular view angle (or range of view angles) of the preliminary panoramic image is problematic.

At step 1116, control circuitry instructs at least one of the first additional device or the second additional device to reposition at least one of the first camera or the second camera to the particular view angle (or range of view angles).

At step 1118, input/output circuitry receives third image data from the at least one of the first camera or the second camera repositioned to the particular view angle (or range of view angles).

At step 1120, control circuitry generates for display, a modified panoramic image using at least a portion of the third image data to modify the portion of the preliminary panoramic image that is problematic.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating for display on a device, a user interface for capturing a panoramic image;
receiving image data from a camera of the device from a plurality of view angles;
receiving video data simultaneously during the receiving the image data, wherein a resolution of the video data is lower than a resolution of the image data;
generating for display on the device a preliminary panoramic image based on the image data;
determining that a portion corresponding to a particular view angle of the preliminary panoramic image is problematic; and
in response to the determining:
identifying, based on the video data, at least a portion of the image data to be used in reconciling the portion of the preliminary panoramic image that is problematic; and
generating for display, an indicator for the preliminary panoramic image prompting for the camera of the device to be repositioned to the particular view angle of the preliminary panoramic image that was determined to be problematic.

2. The method of claim 1, further comprising:
receiving additional image data from the camera repositioned to the particular view angle; and
generating for display, a modified panoramic image using at least a portion of the additional image data to modify the portion of the preliminary panoramic image that is problematic.

3. The method of claim 1, further comprising:
receiving video data simultaneously during the receiving the image data; and
generating a modified panoramic image using at least a portion of the video data to modify the portion of the preliminary panoramic image that is problematic.

4. The method of claim 1, further comprising:
comparing two or more images of the image data using a correlation function;
detecting that corresponding portions of the two or more images vary above a threshold amount; and
responsive to the detecting that the corresponding portions of the two or more images vary above the threshold amount:
generating for display, an indicator prompting for the camera of the device to be moved more slowly or to stop being moved.

5. The method of claim 1, further comprising:
receiving depth data simultaneously during the receiving the image data; and
generating a point cloud using the depth data, wherein the determining that the portion of the preliminary panoramic image is problematic comprises detecting excess information in a region in the point cloud and/or detecting one or more holes in the point cloud.

6. The method of claim 1, further comprising:
receiving additional image data from the camera repositioned to the particular view angle;

generating for display, a first modified panoramic image and a second modified panoramic image based at least in part on the additional image data; and generating for display, the first modified panoramic image and the second modified panoramic image as selectable options on the user interface for storage.

7. The method of claim 6, wherein the selectable options are arranged in an order on the user interface based on a quality of continuity of the corresponding modified panoramic image.

8. The method of claim 6, further comprising generating for display, a corresponding preview option for each of the selectable options to preview the corresponding modified panoramic image.

9. The method of claim 1, further comprising:
receiving video data simultaneously during the receiving the image data;
generating an animated image corresponding to the portion of the preliminary panoramic image that is problematic based at least in part on the video data; and
generating an animated panoramic image based on the preliminary panoramic image and the animated image by replacing the portion of the preliminary panoramic image that is problematic with the animated image.

10. The method of claim 1, wherein the determining that the portion corresponding to the particular view angle of the preliminary panoramic image is problematic comprises:
receiving a user input indicating that one or more areas of the preliminary panoramic image are problematic.

11. The method of claim 1, further comprising:
receiving additional image data from the camera repositioned to the particular view angle; and
during the receiving the additional image data, generating for display, a preliminary modified panoramic image based at least in part on the additional image data.

12. The method of claim 1, further comprising:
detecting a current view angle of the camera; and
comparing the current view angle of the camera to the particular view angle, wherein the indicator for the preliminary panoramic image is generated based on the comparison.

13. The method of claim 1, wherein in response to the determining that the portion of the preliminary panoramic image is problematic:
highlighting the portion of the preliminary panoramic image that is problematic; and
generating for display, a selectable option to reconstruct the portion of the preliminary panoramic image, wherein inpainting is used to reconstruct the portion of the preliminary panoramic image.

14. The method of claim 1, further comprising:
generating for display, a 2D guidance indicator prompting for the camera to be repositioned in a horizontal or vertical direction to generate a 2D panoramic image.

15. The method of claim 1, further comprising:
receiving a user input indicating a first position and a second position for capturing another panoramic image comprising:
instructing a first additional device with a first additional camera to position the first additional camera to the first position;
receiving a user input that indicates a selection of the first position of the first additional device;
instructing a second additional device with a second additional camera to position the second additional camera to the second position; and receiving a user input that indicates a selection of the second position of the second additional device;
determining a first path for the first additional device based on the first position and the second position for capturing the other panoramic image;
determining a second path for the second additional device based on the first position and the second position for capturing the other panoramic image;
instructing the first additional device to position the first additional camera along the first path;
instructing the second additional device to move the second additional camera along the second path;
receiving first additional image data from the first additional camera;
receiving second additional image data from the second additional camera;
generating for display another preliminary panoramic image based on the first additional image data and the second additional image data;
determining that another portion corresponding to another particular view angle of the other preliminary panoramic image is problematic;
instructing at least one of the first additional device or the second additional device to reposition at least one of the first additional camera or the second additional camera to the other particular view angle;
receiving third additional image data from the at least one of the first additional camera or the second additional camera repositioned to the other particular view angle; and
generating for display, a modified panoramic image using at least a portion of the third additional image data to modify the portion of the other preliminary panoramic image that is problematic.

16. The method of claim 1, further comprising:
receiving a user input to set optical characteristics and boundaries for capturing a virtual panoramic image in a virtual environment;
reconstructing the capture of the virtual panoramic image using a virtual camera with the set optical characteristics to capture an area indicated by the set boundaries; and
projecting the captured 3D scene on a 2D plane to generate the virtual panoramic image.

17. The method of claim 16, wherein:
the user input comprises at least one of head motions, controller input, tracked eye gaze, or hand gestures to select four points representing a capture plane; and
the user input further comprises a selected focal distance to set a focal distance of the virtual camera.

18. A method comprising:
generating for display on a device, a user interface for capturing a panoramic image;
receiving image data from a camera of the device from a plurality of view angles;
generating for display on the device a preliminary panoramic image based on the image data;
determining that a portion corresponding to a particular view angle of the preliminary panoramic image is problematic;
in response to the determining:
generating for display, an indicator for the preliminary panoramic image prompting for the camera of the device to be repositioned to the particular view angle of the preliminary panoramic image that was determined to be problematic;

receiving a user input indicating a first position and a second position for capturing another panoramic image comprising:
- instructing an additional device with an additional camera to position the additional camera to the first position;
- receiving a user input that indicates a selection of the first position of the additional device;
- instructing the additional device to position the additional camera to the second position; and
- receiving a user input that indicates a selection of the second position of the additional device;

instructing the additional device to position the additional camera to the first position and to pan the additional camera to the second position;

receiving first additional image data from the additional camera;

generating for display another preliminary panoramic image based on the first additional image data;

determining that another portion corresponding to another particular view angle of the other preliminary panoramic image is problematic;

instructing the additional device to reposition the additional camera to the other particular view angle;

receiving second additional image data from the additional camera repositioned to the particular view angle; and generating for display, a modified panoramic image using at least a portion of the second additional image data to modify the portion of the other preliminary panoramic image that is problematic.

19. A system comprising:

control circuitry configured to:
- generate for display on a device, a user interface for capturing a panoramic image; and input/output circuitry configured to:
- receive image data from a camera of the device from a plurality of view angles; and
- receive video data simultaneously during the receiving the image data, wherein a resolution of the video data is lower than a resolution of the image data;

wherein the control circuitry is further configured to:
- generate for display on the device a preliminary panoramic image based on the image data;
- determine that a portion corresponding to a particular view angle of the preliminary panoramic image is problematic; and
- in response to determining that the portion corresponding to the particular view angle of the preliminary panoramic image is problematic:
  - identify, based on the video data, at least a portion of the image data to be used in reconciling the portion of the preliminary panoramic image that is problematic; and
  - generate for display, an indicator for the preliminary panoramic image prompting for the camera of the device to be repositioned to the particular view angle of the preliminary panoramic image that was determined to be problematic.

* * * * *